US012593264B2

(12) United States Patent
Fitzpatrick, III et al.

(10) Patent No.: US 12,593,264 B2
(45) Date of Patent: Mar. 31, 2026

(54) BROADCAST AUDIO FOR SYNCHRONIZED PLAYBACK BY WEARABLES

(71) Applicant: Sonos, Inc., Santa Barbara, CA (US)

(72) Inventors: Edwin Joseph Fitzpatrick, III, Boston, MA (US); Walter Rivera, Atascadero, CA (US)

(73) Assignee: Sonos, Inc., Goleta, CA (US)

( * ) Notice: Subject to any disclaimer, the term of this patent is extended or adjusted under 35 U.S.C. 154(b) by 578 days.

(21) Appl. No.: 17/955,469

(22) Filed: Sep. 28, 2022

(65) Prior Publication Data

US 2023/0112398 A1    Apr. 13, 2023

Related U.S. Application Data

(60) Provisional application No. 63/250,299, filed on Sep. 30, 2021.

(51) Int. Cl.
*H04W 48/10* (2009.01)
*H04B 17/327* (2015.01)
*H04W 76/14* (2018.01)

(52) U.S. Cl.
CPC .......... *H04W 48/10* (2013.01); *H04B 17/327* (2015.01); *H04W 76/14* (2018.02)

(58) Field of Classification Search
CPC ..... H04W 48/10; H04W 76/14; H04B 17/327
See application file for complete search history.

(56) References Cited

U.S. PATENT DOCUMENTS 5,440,644 A    8/1995 Farinelli et al.
5,761,320 A    6/1998 Farinelli et al.

5,923,902 A    7/1999 Inagaki
6,032,202 A    2/2000 Lea et al.
6,256,554 B1    7/2001 DiLorenzo
6,404,811 B1    6/2002 Cvetko et al.
6,469,633 B1    10/2002 Wachter (Continued)

FOREIGN PATENT DOCUMENTS

EP           1389853 A1    2/2004
WO         200153994       7/2001
WO      2003093950 A2    11/2003

OTHER PUBLICATIONS

AudioTron Quick Start Guide, Version 1.0, Mar. 2001, 24 pages.

(Continued)

*Primary Examiner* — Olisa Anwah

(74) *Attorney, Agent, or Firm* — Akerman LLP

(57)    ABSTRACT

Disclosed embodiments include a playback device configured to: (i) obtain audio from an audio source via a Wireless Local Area Network (WLAN); (ii) generate broadcast times for individual portions of the audio content; and (iii) broadcast portions of the audio content to a Personal Area Network (PAN). Embodiments also include a wearable device configured to play audio received via a first PAN from a first playback device; (ii) while playing the audio received via the first PAN from the first playback device, determine whether the wearable device should switch to receiving the audio via a second PAN from a second playback device; and (iii) after determining that the wearable device should switch to receiving the audio via the second PAN, switch to receiving the audio via the second PAN and play the audio received via the second PAN.

19 Claims, 20 Drawing Sheets

(56) References Cited

U.S. PATENT DOCUMENTS

| | | | |
|---|---|---|---|
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 12,175,161 | B2 * | 12/2024 | Wilberding ............. G06F 3/165 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2014/0098713 | A1 * | 4/2014 | Beckhardt .......... H04N 21/6125 370/255 |
| 2017/0192739 | A1 * | 7/2017 | Gossain ................ H04L 65/762 |
| 2020/0112810 | A1 * | 4/2020 | Young ..................... H04S 1/005 |
| 2020/0280800 | A1 * | 9/2020 | Wilberding ............ H04R 3/005 |
| 2020/0367006 | A1 * | 11/2020 | Beckhardt ............... H04S 3/008 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www. reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

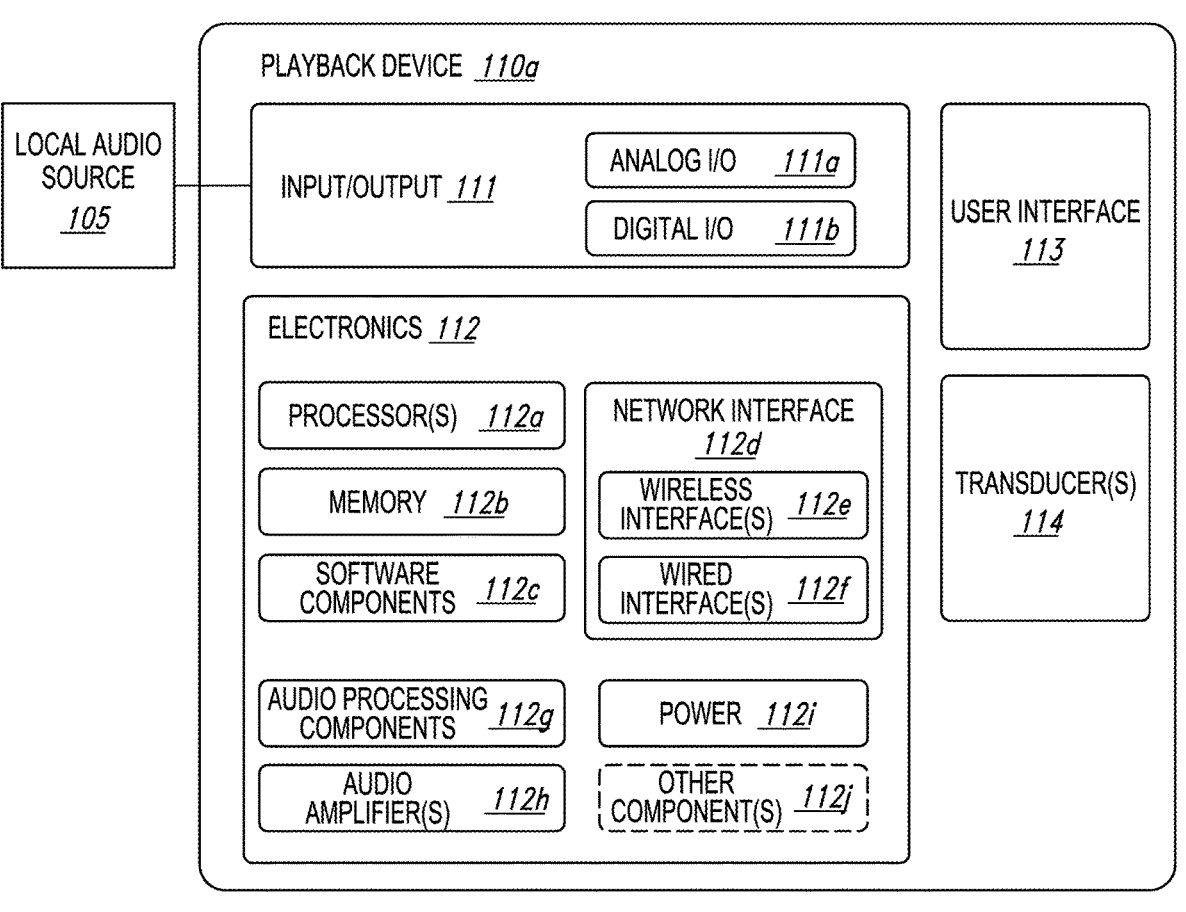
Fig. 1C
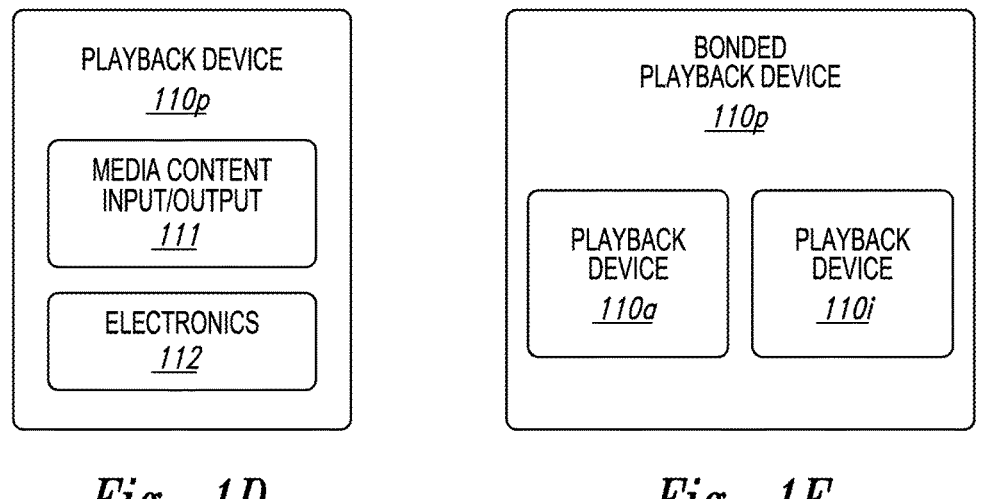
Fig. 1D                                    Fig. 1E

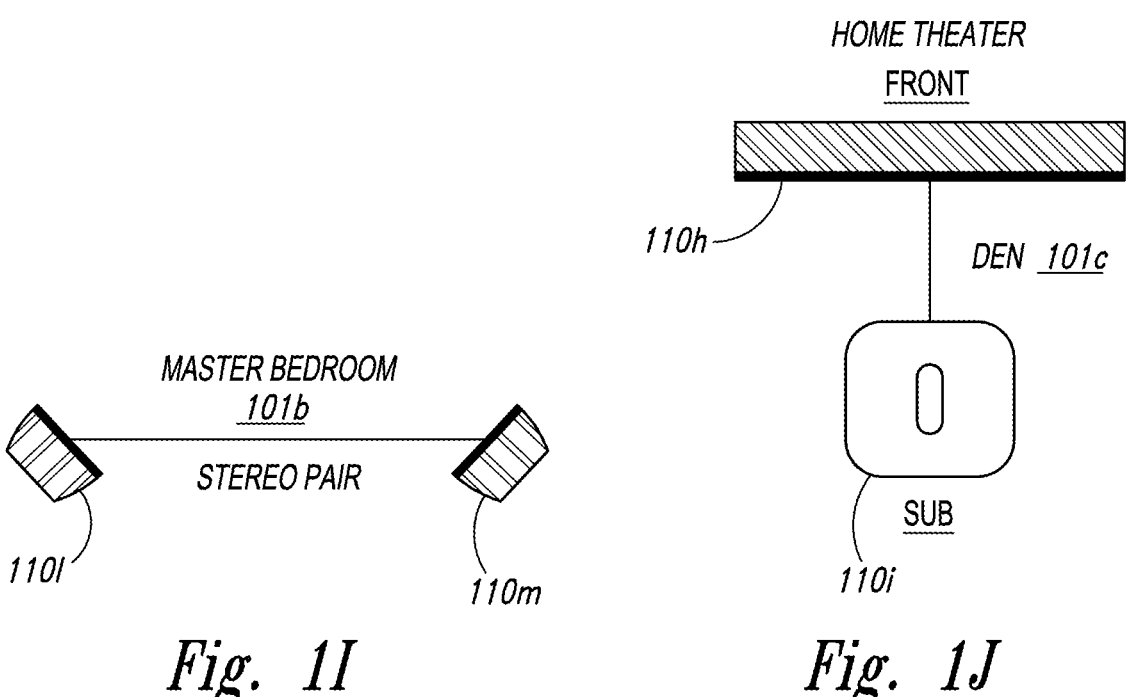
*Fig. 1I*
*Fig. 1J*
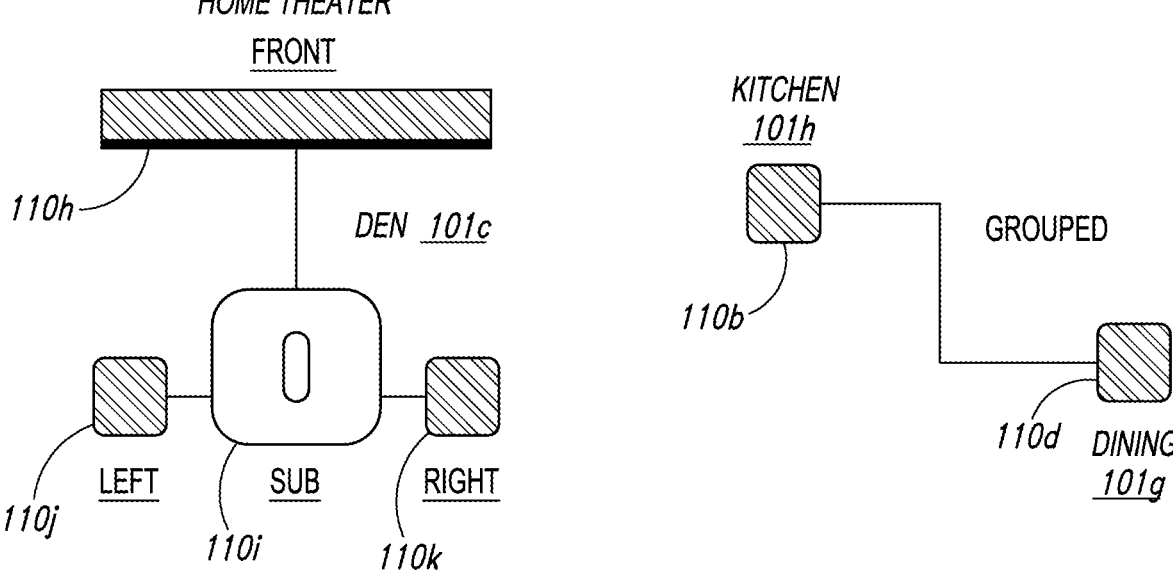
*Fig. 1K*
*Fig. 1L*

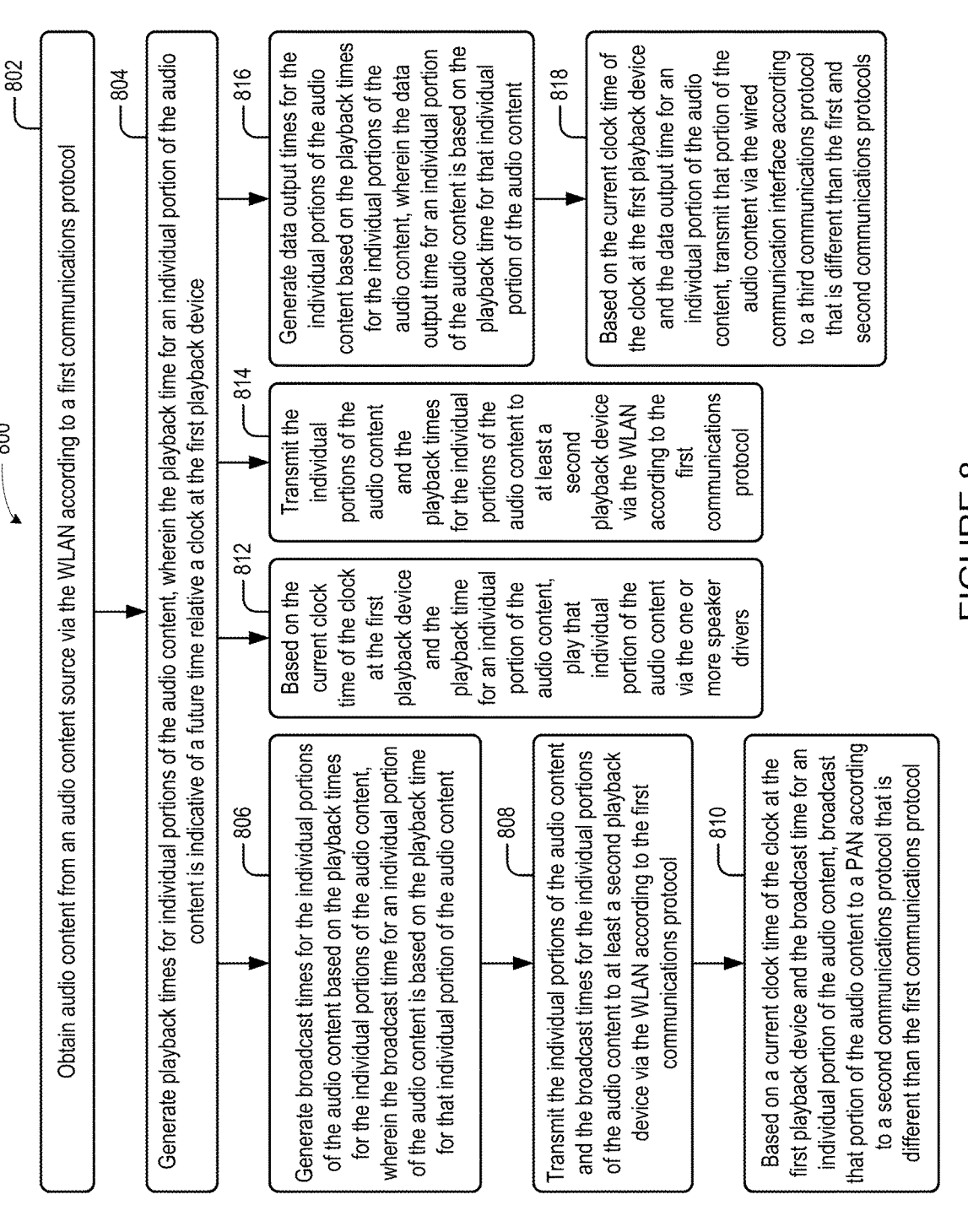

800

802 — Obtain audio content from an audio content source via the WLAN according to a first communications protocol 804 — Generate playback times for individual portions of the audio content, wherein the playback time for an individual portion of the audio content is indicative of a future time relative a clock at the first playback device 806 — Generate broadcast times for the individual portions of the audio content based on the playback times for the individual portions of the audio content, wherein the broadcast time for an individual portion of the audio content is based on the playback time for that individual portion of the audio content 808 — Transmit the individual portions of the audio content and the broadcast times for the individual portions of the audio content to at least a second playback device via the WLAN according to the first communications protocol 810 — Based on a current clock time of the clock at the first playback device and the broadcast time for an individual portion of the audio content, broadcast that portion of the audio content to a PAN according to a second communications protocol that is different than the first communications protocol 812 — Based on the current clock time of the clock at the first playback device and the playback time for an individual portion of the audio content, play that individual portion of the audio content via the one or more speaker drivers 814 — Transmit the individual portions of the audio content and the playback times for the individual portions of the audio content to at least a second playback device via the WLAN according to the first communications protocol 816 — Generate data output times for the individual portions of the audio content based on the playback times for the individual portions of the audio content, wherein the data output time for an individual portion of the audio content is based on the playback time for that individual portion of the audio content 818 — Based on the current clock time of the clock at the first playback device and the data output time for an individual portion of the audio content, transmit that portion of the audio content via the wired communication interface according to a third communications protocol that is different than the first and second communications protocols

FIGURE 8

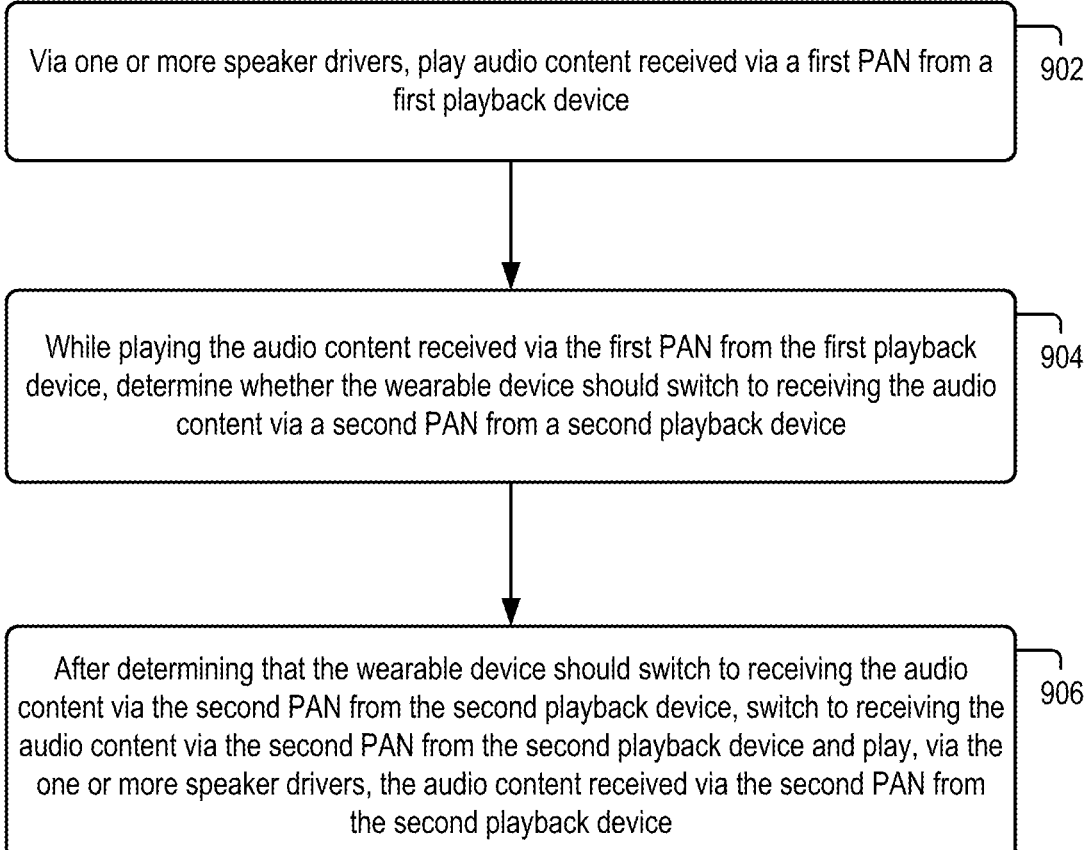

900

Via one or more speaker drivers, play audio content received via a first PAN from a first playback device    902

While playing the audio content received via the first PAN from the first playback device, determine whether the wearable device should switch to receiving the audio content via a second PAN from a second playback device    904

After determining that the wearable device should switch to receiving the audio content via the second PAN from the second playback device, switch to receiving the audio content via the second PAN from the second playback device and play, via the one or more speaker drivers, the audio content received via the second PAN from the second playback device    906

FIGURE 9

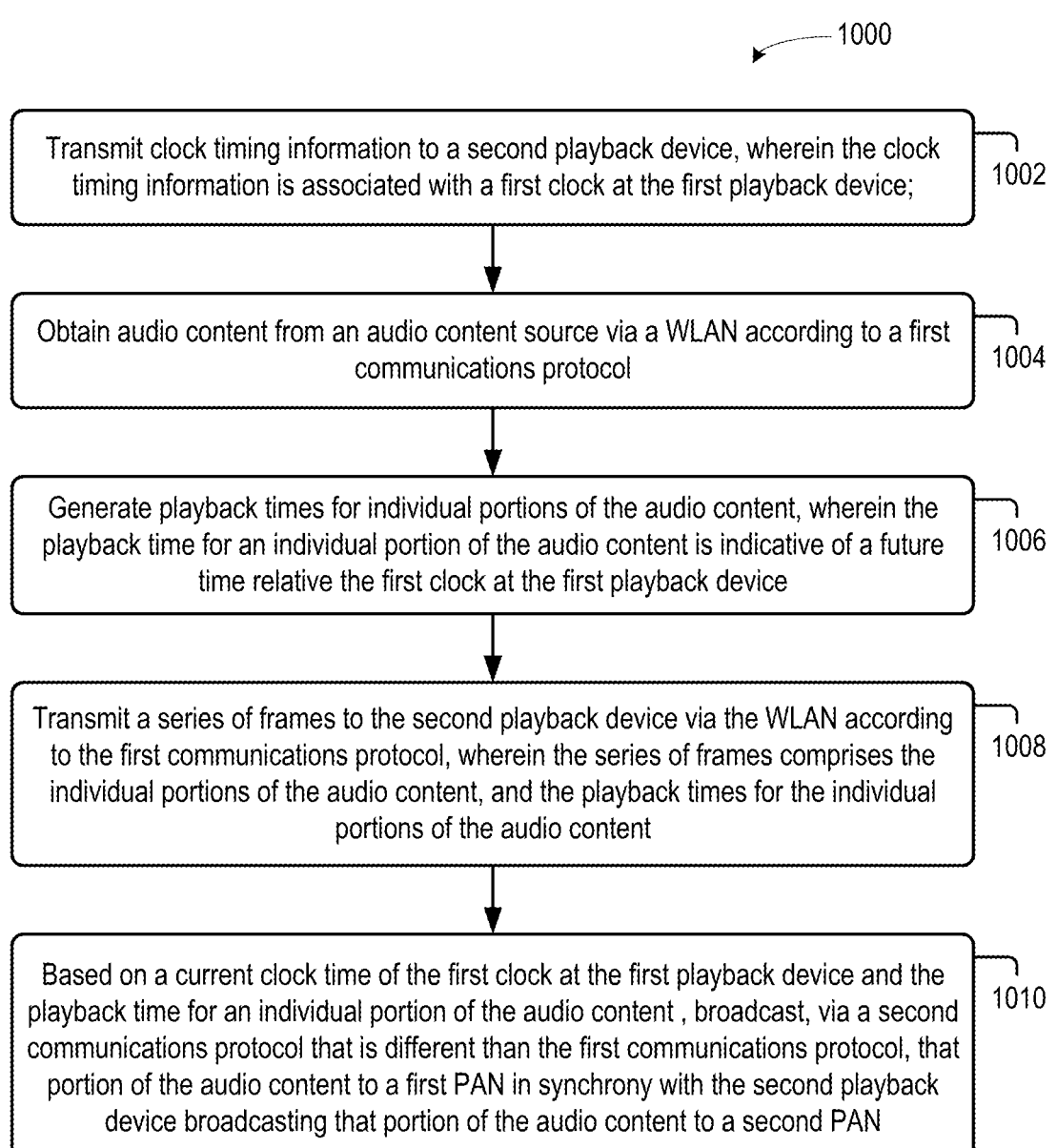

1000

Transmit clock timing information to a second playback device, wherein the clock timing information is associated with a first clock at the first playback device; — 1002

Obtain audio content from an audio content source via a WLAN according to a first communications protocol — 1004

Generate playback times for individual portions of the audio content, wherein the playback time for an individual portion of the audio content is indicative of a future time relative the first clock at the first playback device — 1006

Transmit a series of frames to the second playback device via the WLAN according to the first communications protocol, wherein the series of frames comprises the individual portions of the audio content, and the playback times for the individual portions of the audio content — 1008

Based on a current clock time of the first clock at the first playback device and the playback time for an individual portion of the audio content , broadcast, via a second communications protocol that is different than the first communications protocol, that portion of the audio content to a first PAN in synchrony with the second playback device broadcasting that portion of the audio content to a second PAN — 1010

FIGURE 10

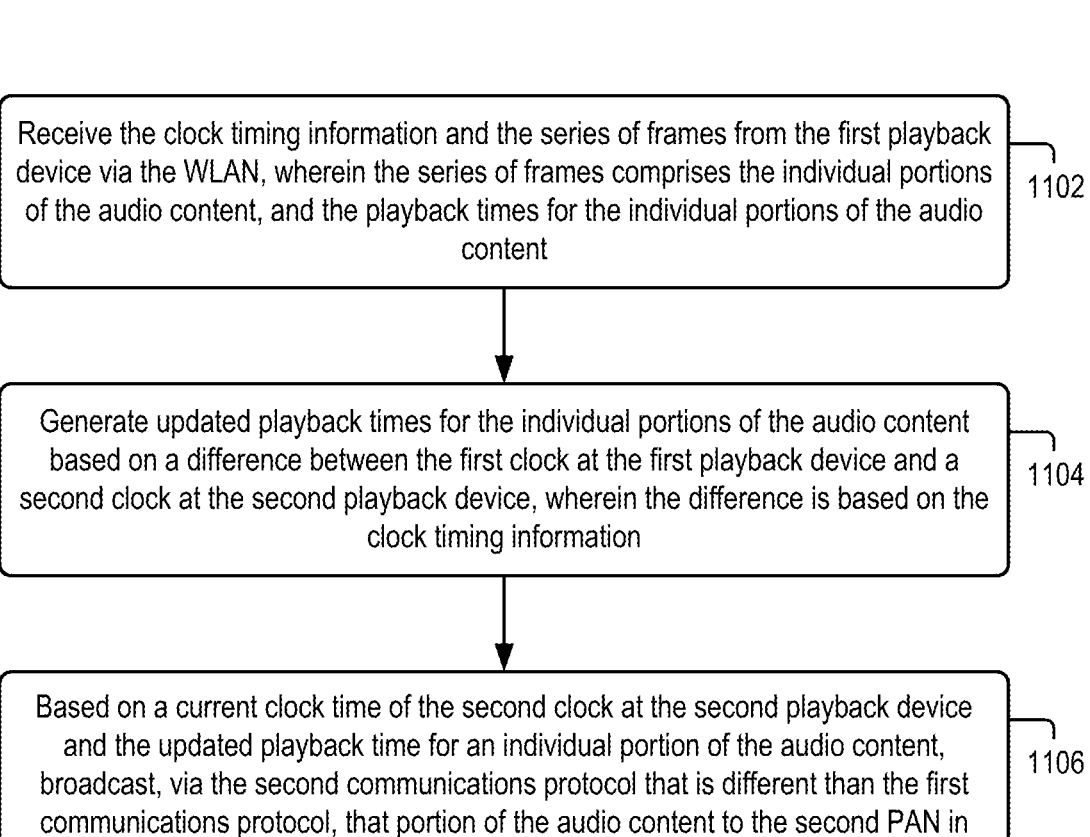

─ 1100

Receive the clock timing information and the series of frames from the first playback device via the WLAN, wherein the series of frames comprises the individual portions of the audio content, and the playback times for the individual portions of the audio content       1102

Generate updated playback times for the individual portions of the audio content based on a difference between the first clock at the first playback device and a second clock at the second playback device, wherein the difference is based on the clock timing information       1104

Based on a current clock time of the second clock at the second playback device and the updated playback time for an individual portion of the audio content, broadcast, via the second communications protocol that is different than the first communications protocol, that portion of the audio content to the second PAN in synchrony with the first playback device broadcasting that portion of the audio content to the first PAN       1106

FIGURE 11

BROADCAST AUDIO FOR SYNCHRONIZED PLAYBACK BY WEARABLES

RELATED APPLICATIONS

This application claims the benefit of priority under 35 U.S.C. § 119(e) of U.S. Provisional Application No. 63/250, 299, filed Sep. 30 2021. The contents of U.S. App. 63/250, 299 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C shows a block diagram of a playback device.

FIG. 1D shows a block diagram of a playback device.

FIG. 1E shows a block diagram of a network microphone device.

FIGS. 1-I through 1L show schematic diagrams of corresponding media playback system zones.

FIG. 8 shows an example method performed by a playback device according to some embodiments.

FIG. 9 shows an example method performed by a wearable device according to some embodiments.

FIG. 10 shows an example method performed by a playback device according to some embodiments.

FIG. 11 shows an example method performed by a playback device according to some embodiments.

Figure 1A:
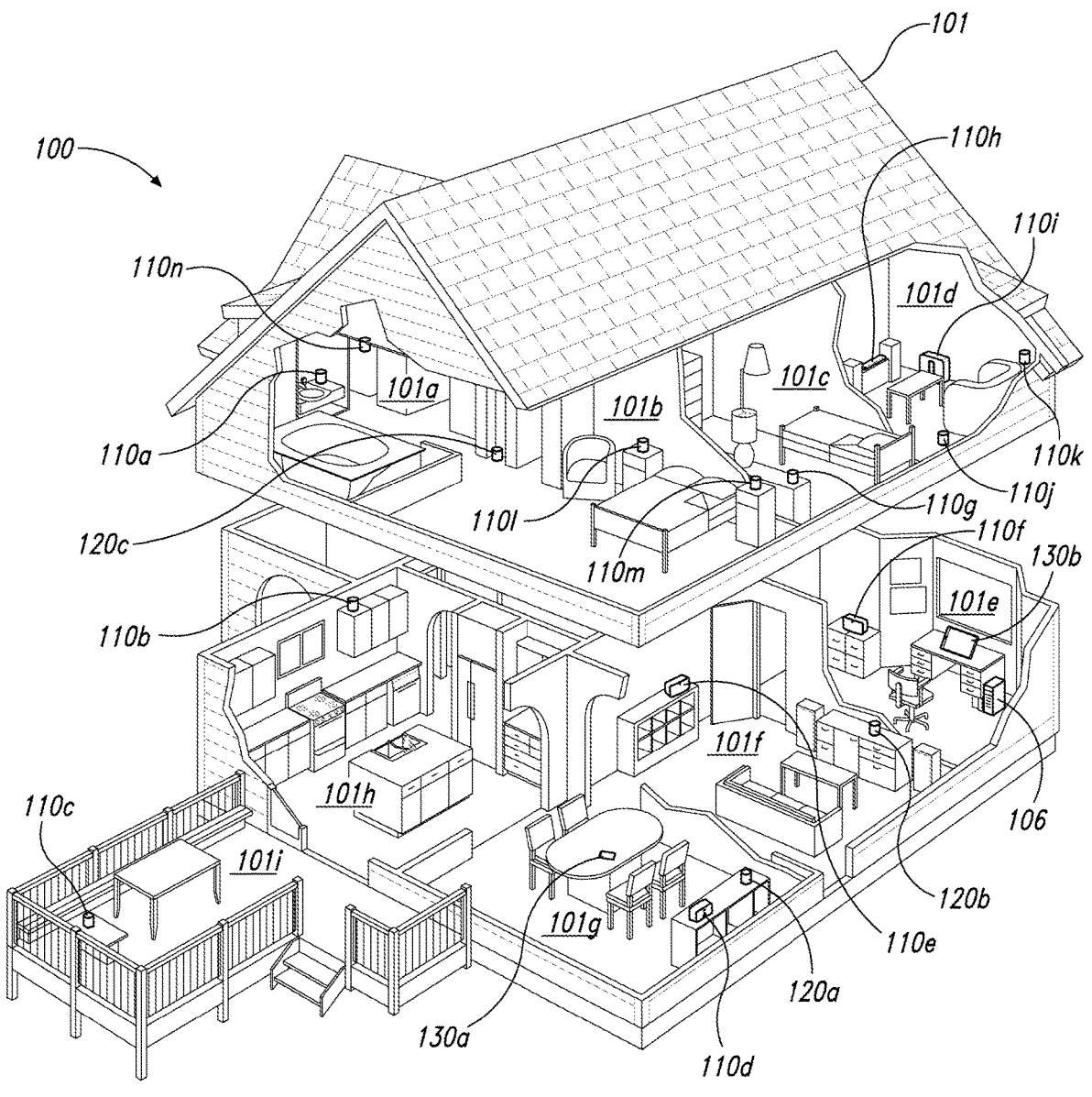
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS Inc. was an early mover in the trend towards incorporating intelligence into common household appliances to form smart devices with enhanced functionality. For instance, the first commercial product launched by SONOS Inc. in 2005 was a network-enabled audio amplifier (referred to as ZP100) that was able to playback audio accessible over a network (e.g., stored on another device on the network). Over the years, SONOS Inc. has continually incorporated additional intelligence into products to enable new features such as audio streaming from cloud servers, voice assistant services (VASs), and control via third-party applications. As a result, playback devices designed for stationary use with consistent access to an external power source (e.g., a power outlet) have become sophisticated devices with extensive computational capabilities (e.g., multi-core application processors, gigabytes of Random Access Memory (RAM), gigabytes of flash memory, etc.) and/or communication capabilities (e.g., multiple wireless radios such as WIFI radios and/or BLUETOOTH radios).

SONOS Inc. has appreciated that wearable devices configured for audio playback and/or hearing enhancement (e.g., headphones, hearables, hearing aids, smart glasses, etc.) are generally severely power constrained devices. For instance, a wireless headphone may have a battery capacity of less than 3 Watt Hours (Wh) given the size constraints of the wireless headphone. Such a wireless headphone would require a power consumption of less than 300 Milliwatts per hour of audio playback to yield a playback time of at least 10 hours. The conventional solution for such power constraints is to severely limit functionality of the wearable device and tether the wearable device to a smartphone or other personal computing device of the user via a BLUETOOTH Classic connection. For instance, a conventional wireless headphone may only be capable of playing back audio received over a BLUETOOTH Classic connection from a smartphone positioned within a limited range of the conventional wireless headphone (e.g., a smartphone in the pocket of a user).

Accordingly, aspects of the present disclosure manifest an appreciation that the existing install base of sophisticated playback devices in homes and businesses may be advantageously leveraged by wearable devices to provide significantly enhanced functionality. For example, in some embodiments, a wearable device (or wearable) can obtain an audio stream from a media playback system proximate the wearable device (e.g., a media playback system in a home or business where the wearable device is operating). As a result, the wearable device may access the full suite of audio content available to the media playback system including, for example, audio streams from cloud-based music streaming services such as SPOTIFY or PANDORA, audio associated with a video being played back by a television connected to (or part of) the media playback system, and/or audio received via a physical line-in port in the media playback system from a record player or other source. Such a suite of audio content sources may be substantially larger than the audio content available to stream over a BLUETOOTH Classic connection via a user's smartphone (e.g., more than any locally stored audio on the smartphone and available cloud-based streaming services). Further, the wearable device is advantageously untethered from a user's smartphone thereby enabling the user to enjoy audio throughout a space (e.g., a home, office, business, etc.) without having to keep a smartphone within range of the wearable device. Accordingly, such a wearable device that can access audio content from a media playback system offers the functionality provided by a sophisticated playback device with consistent access to power in a wearable form factor without compromising on the size and/or battery life of the wearable.

In some embodiments, a playback device is configured to, among other features, (i) obtain audio content from an audio content source via a Wireless Local Area Network (WLAN) (e.g., a WiFi network) according to a first communications protocol (e.g., WiFi); (ii) generate playback times for individual portions of the audio content, where the playback time for an individual portion of the audio content is indicative of a future time relative a clock at the first playback device; (iii) generate broadcast times for the individual portions of the audio content based on the playback times for the individual portions of the audio content, where the broadcast time for an individual portion of the audio content is based on the playback time for that individual portion of the audio content; and (iv) based on a current clock time of the clock at the first playback device and the broadcast time for an individual portion of the audio content, broadcast that portion of the audio content to a Personal Area Network (PAN) (e.g., a Bluetooth PAN) according to a second communications protocol (e.g., Bluetooth, including Bluetooth Classic, Bluetooth Low Energy, or similar) that is different than the first communications protocol. In embodiments where a media playback system includes several playback devices, individual playback devices in the media playback system are configured to broadcast the audio content via respective PAN interfaces in synchrony (or at least substantially in synchrony), thereby enabling a wearable to switch between receiving the audio content via different PANs operated by different playback devices as a wearer moves throughout a home, office, or other location where the media playback device is operating.

And a wearable according to some embodiments is configured to, among other features, (i) via one or more speaker drivers, play audio content received via a first PAN (e.g., via a Bluetooth or similar PAN) from a first playback device; (ii) while playing the audio content received via the first PAN from the first playback device, determine whether the wearable device should switch to receiving the audio content via a second PAN from a second playback device; and (iii) after determining that the wearable device should switch to receiving the audio content via the second PAN from the second playback device, switch to receiving the audio content via the second PAN from the second playback device and play, via the one or more speaker drivers, the audio content received via the second PAN from the second playback device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
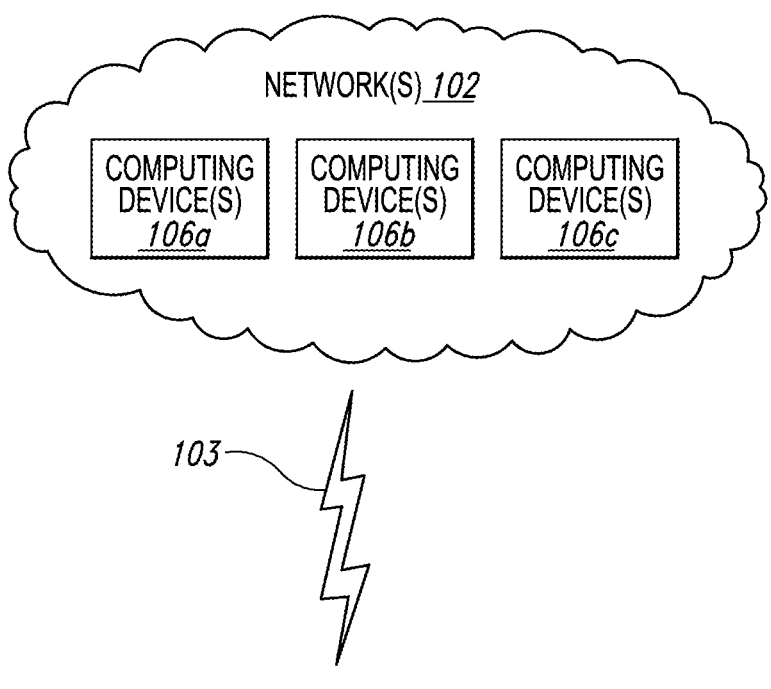
FIG. 1B shows a schematic diagram of the media playback system of FIG. 1A and one or more networks.
Figure 1B:
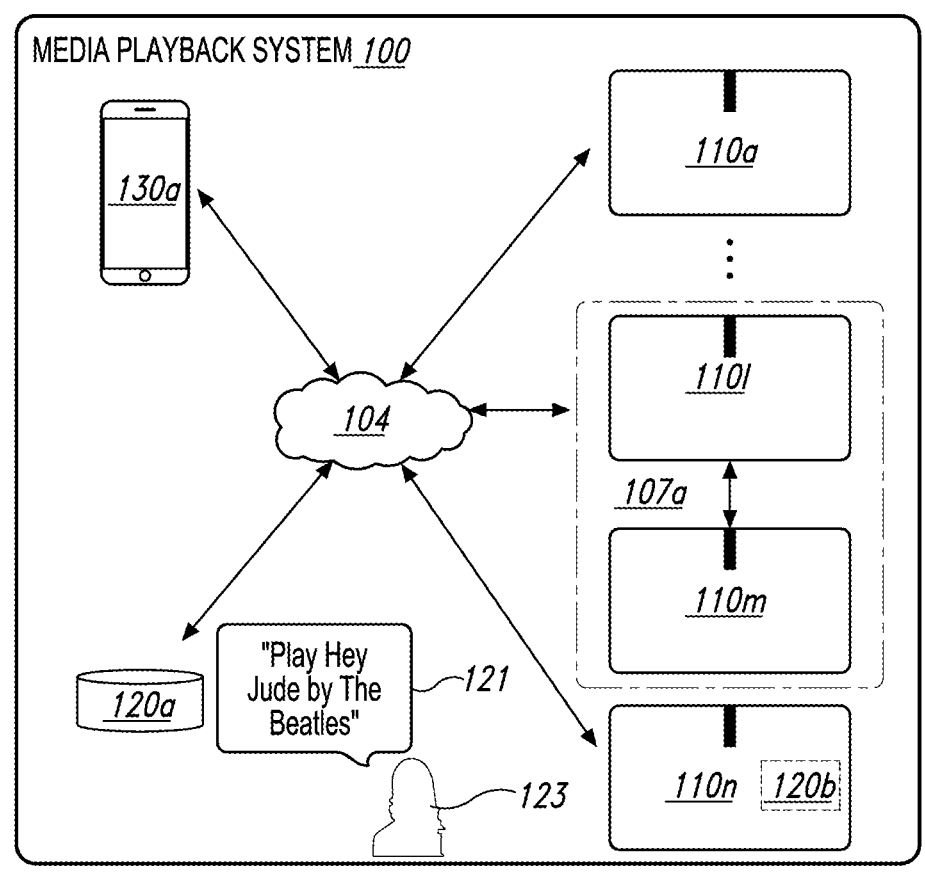

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11 g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communications links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communications links configured to carry analog signals) and/or a digital I/O 111*b* (e.g., one or more wires, cables, or other suitable communications links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communications links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio content from an audio source (e.g., one or more of the computing devices 106*a-c* (FIG. 1B)), and/or another one of the playback devices 110. In some embodiments, the operations further include causing the playback device 110*a* to send audio content to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
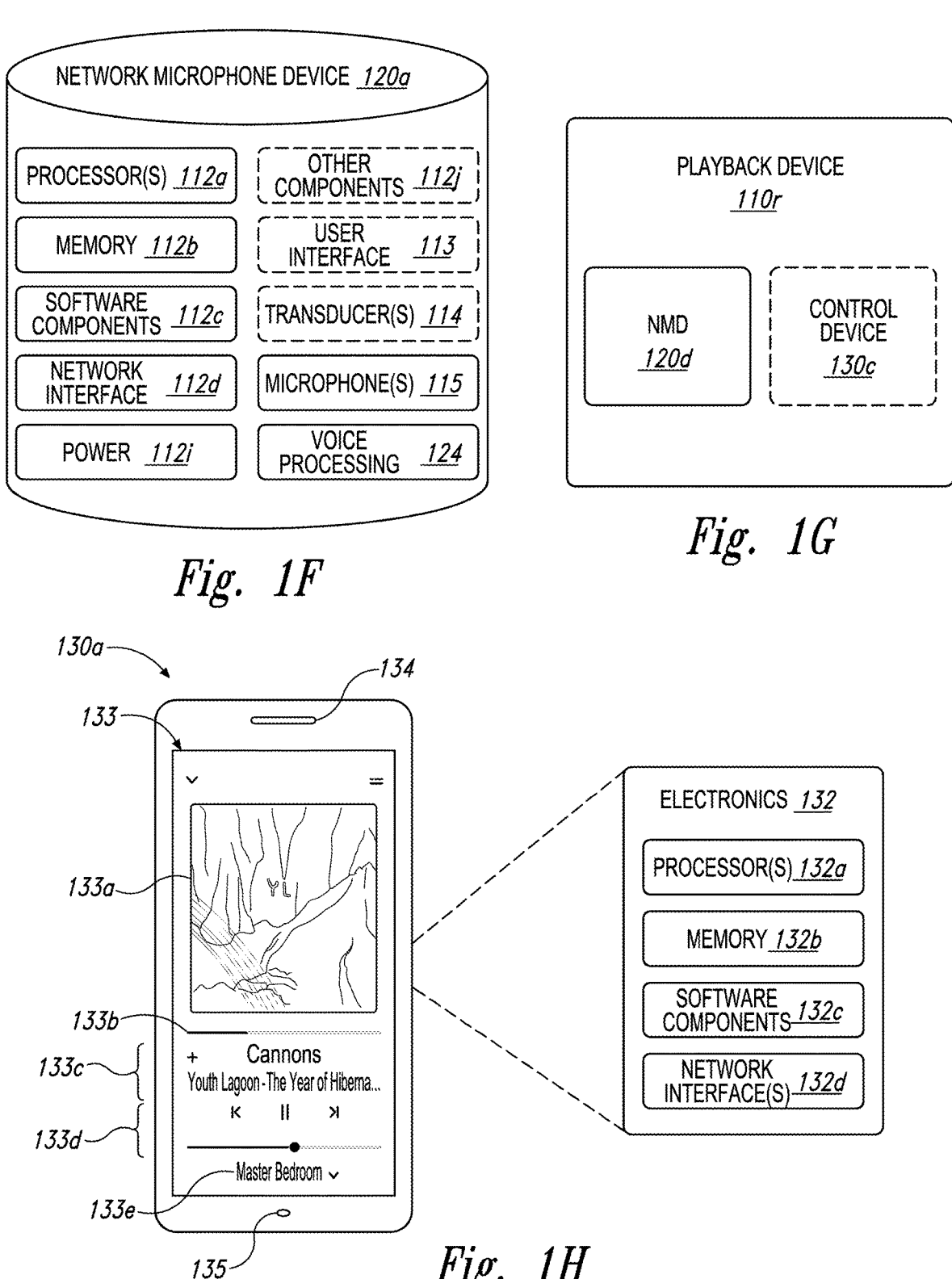
FIG. 1F shows a block diagram of a network microphone device.
FIG. 1G shows a block diagram of a playback device.
FIG. 1H shows a partially schematic diagram of a control device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11 g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
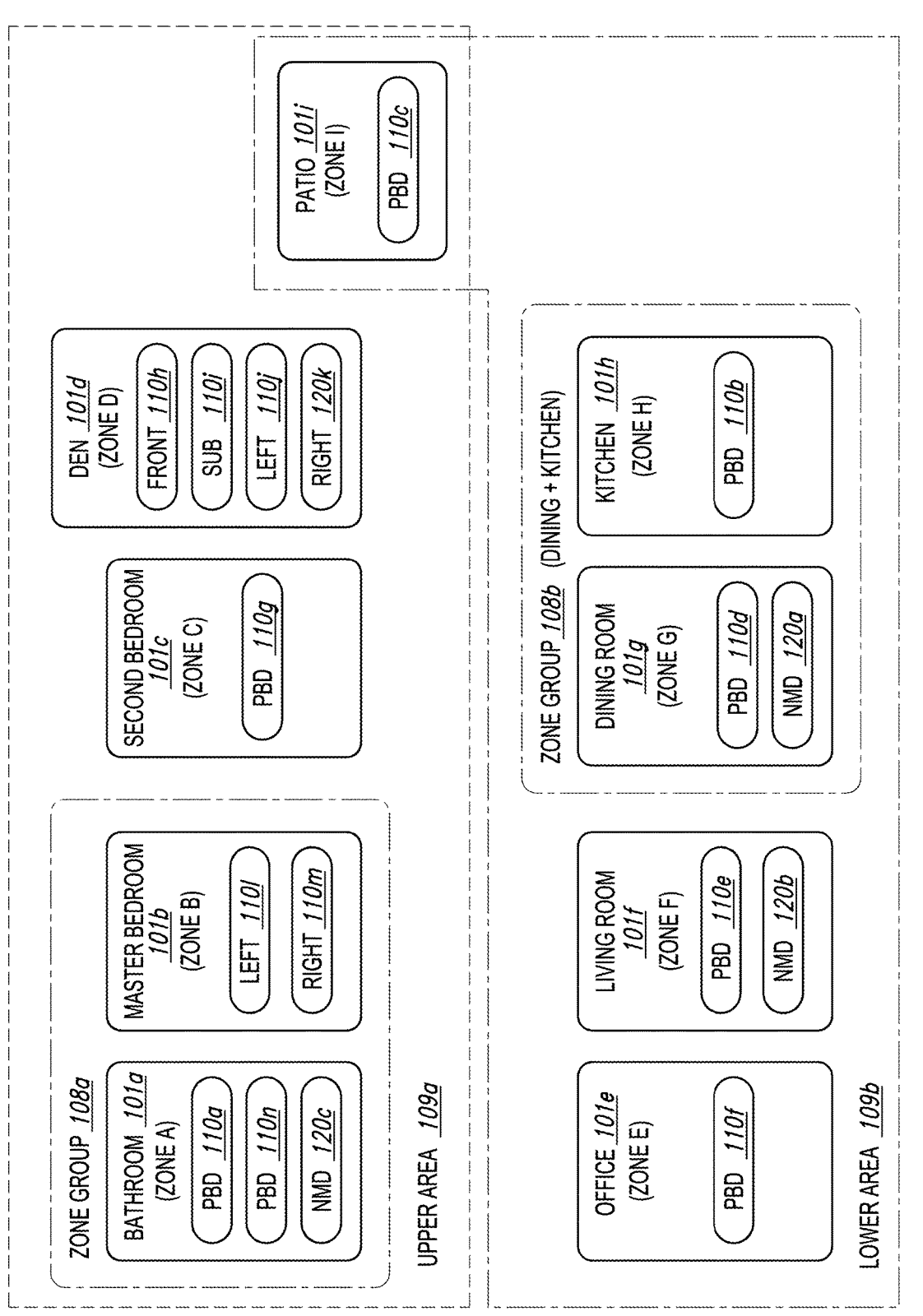
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
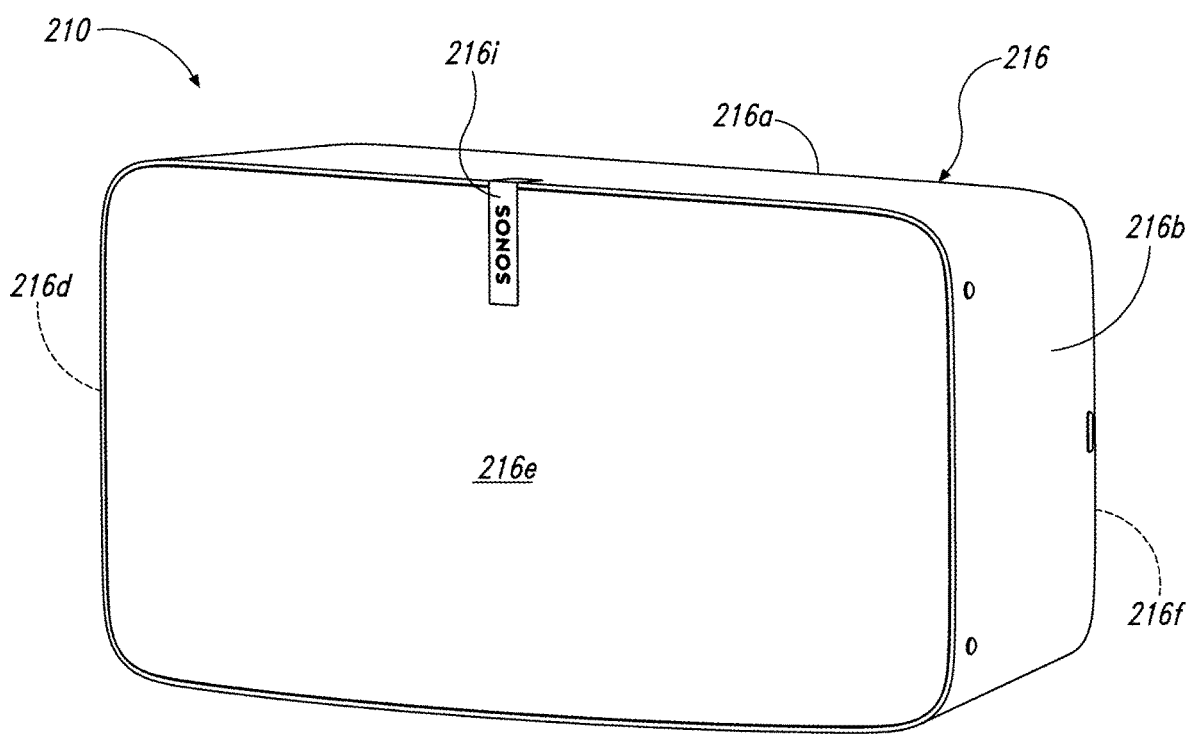
FIG. 2A shows a front isometric view of a playback device configured in accordance with aspects of the disclosed technology.
Figure 2B:
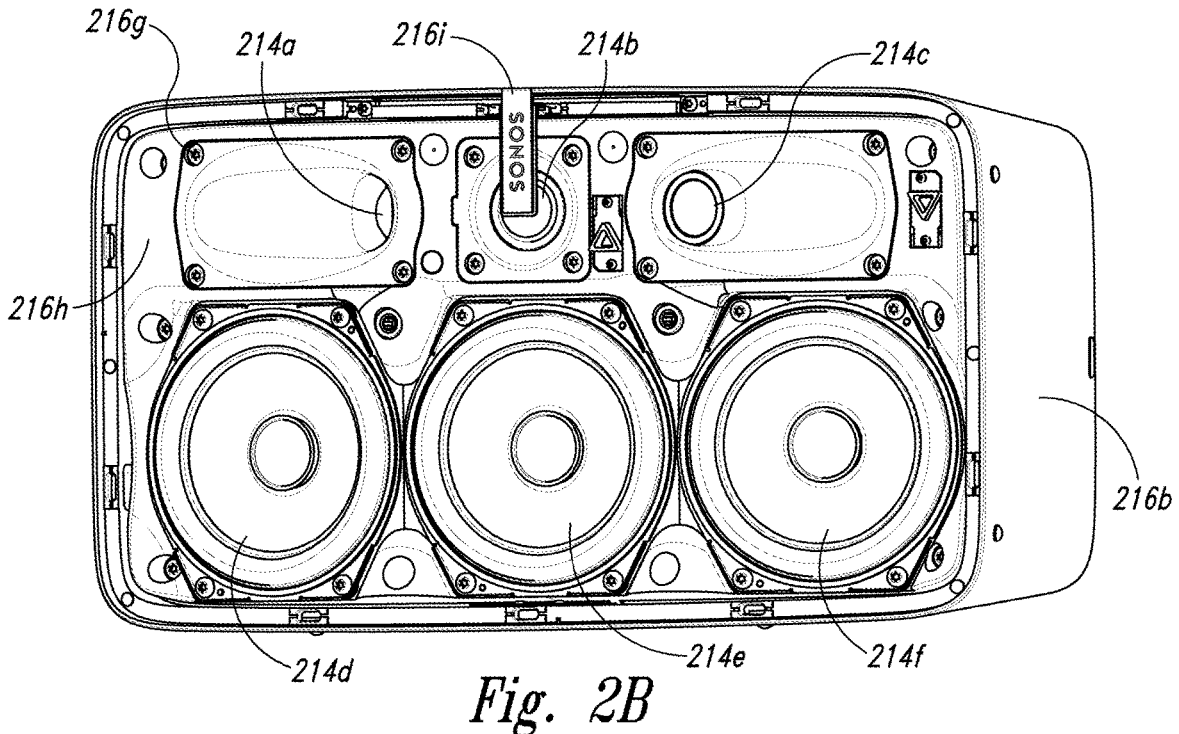
FIG. 2B shows a front isometric view of the playback device of FIG. 3A without a grille.
Figure 2C:
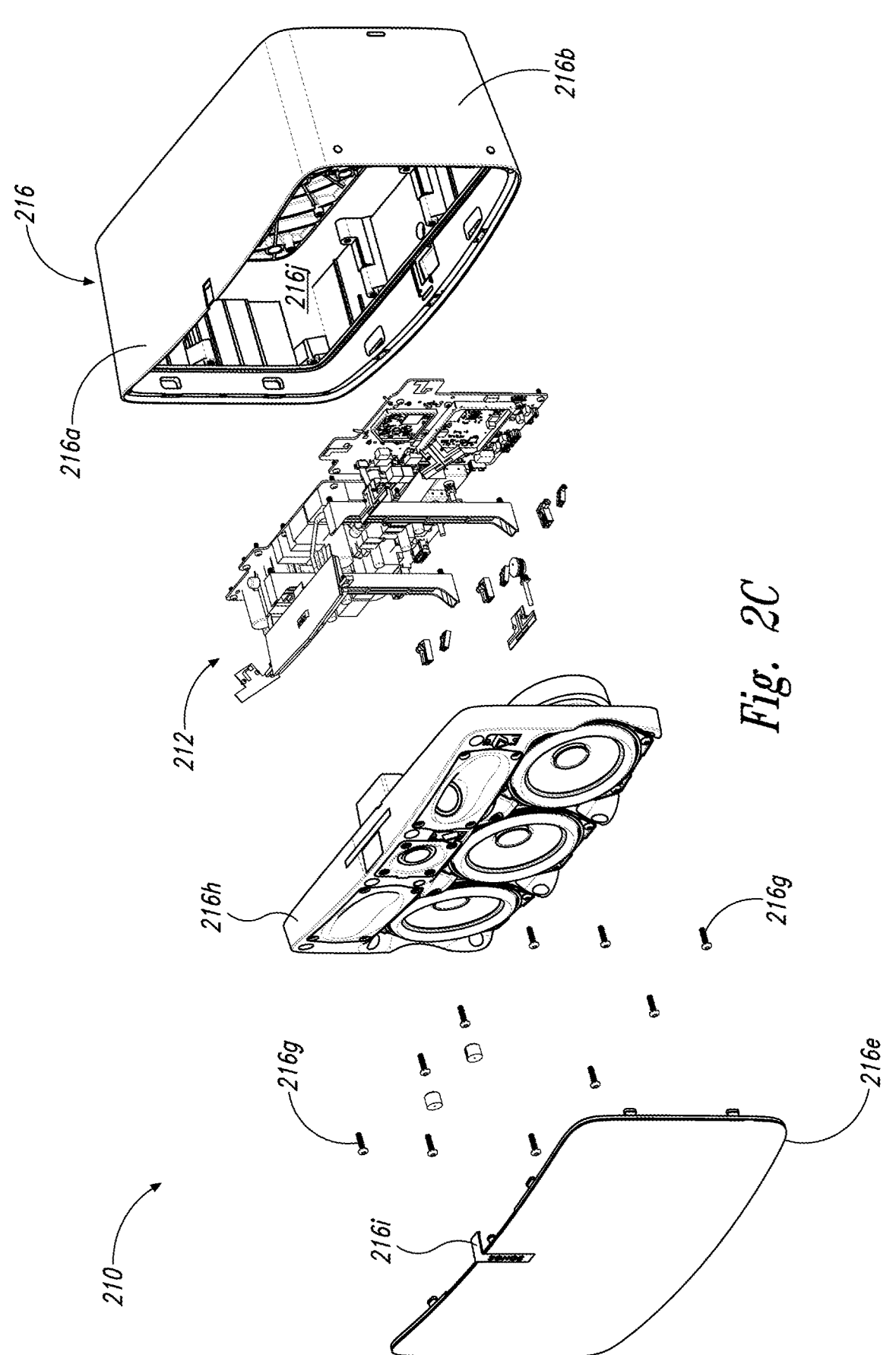
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figures 3A, 3B:
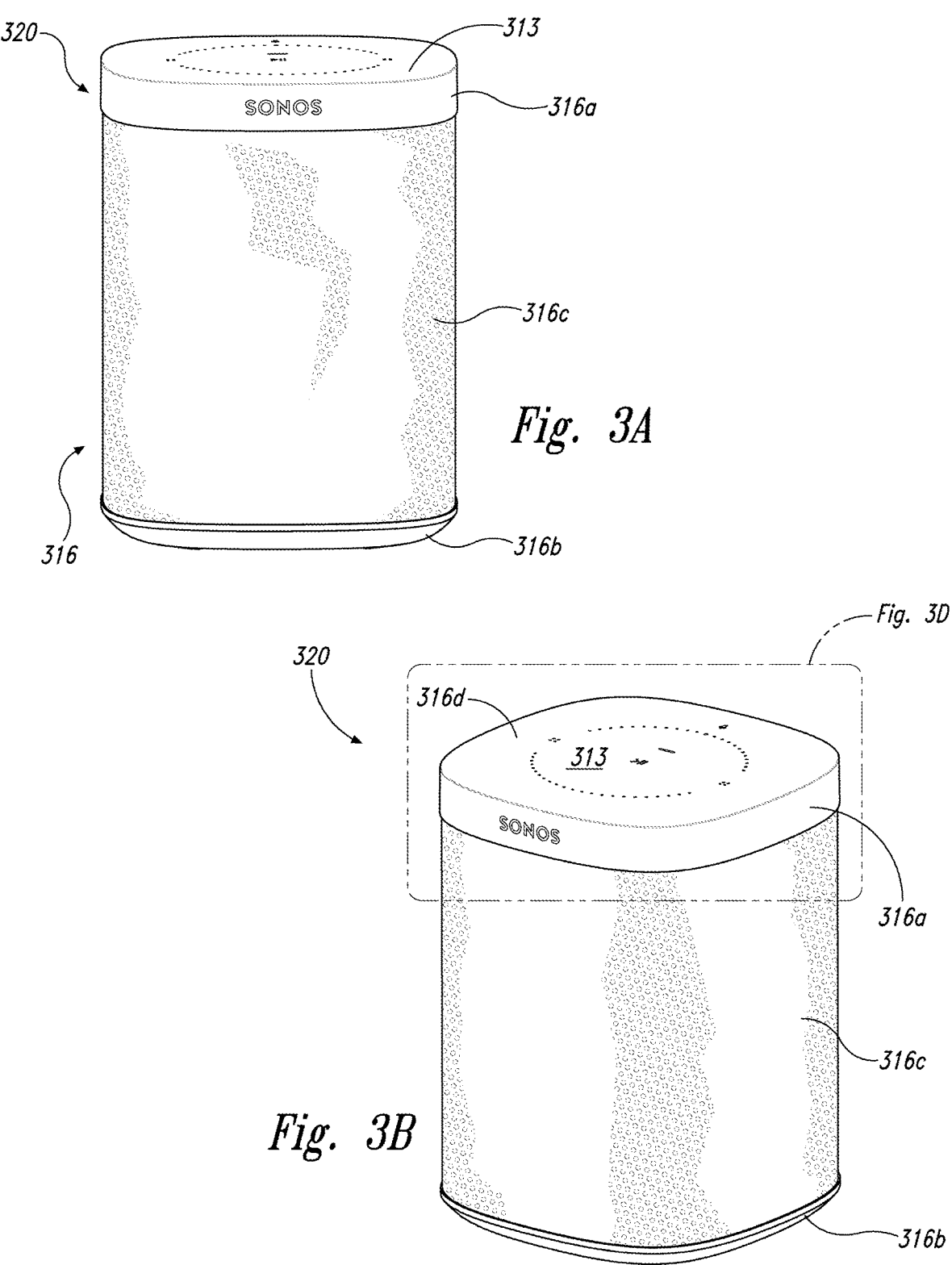
FIG. 3A shows a front view of a network microphone device configured in accordance with aspects of the disclosed technology.
FIG. 3B shows a side isometric view of the network microphone device of FIG. 3A.
Figure 3C:
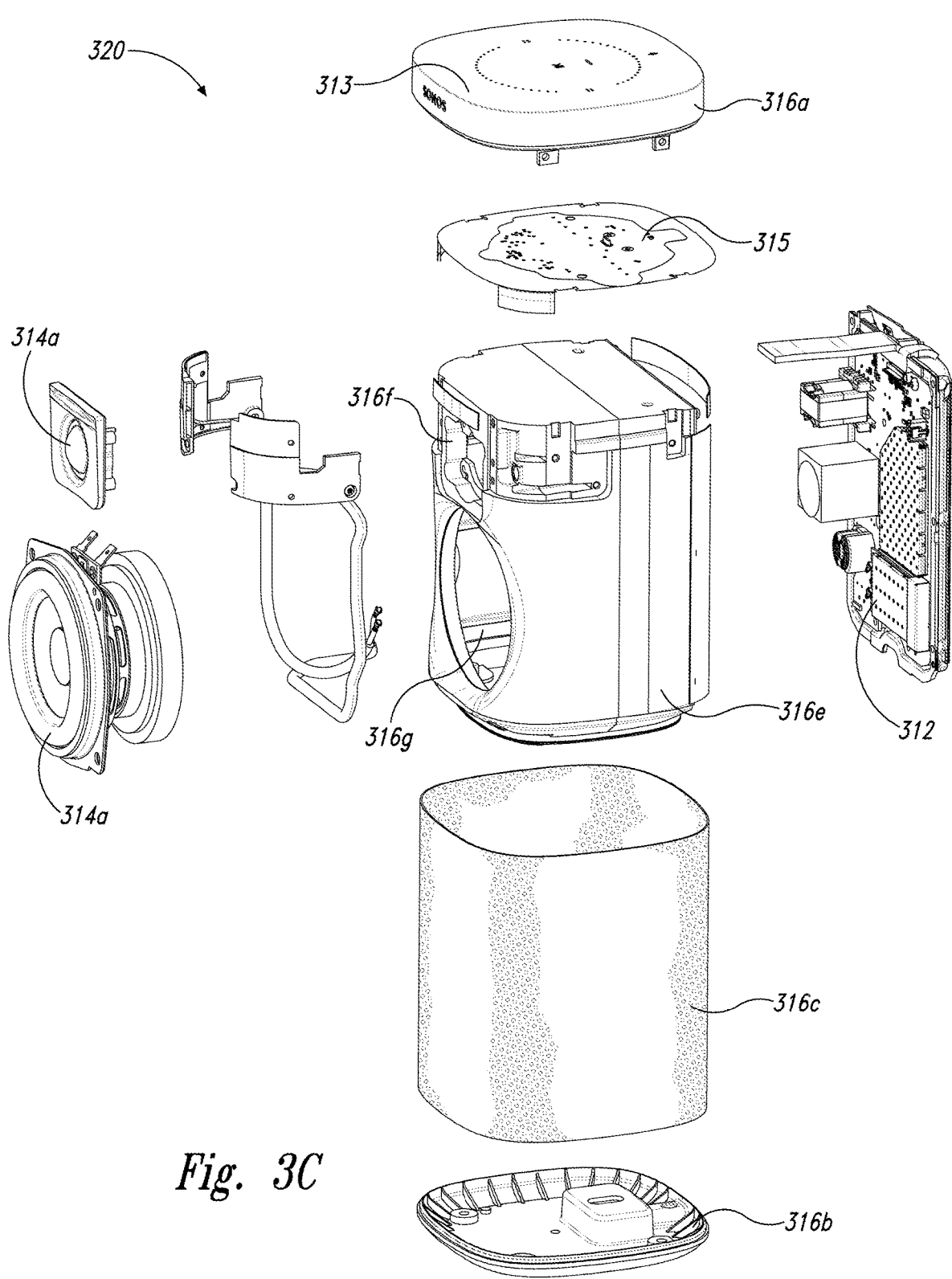
FIG. 3C shows an exploded view of the network microphone device of FIGS. 3A and 3B.
Figure 3D:
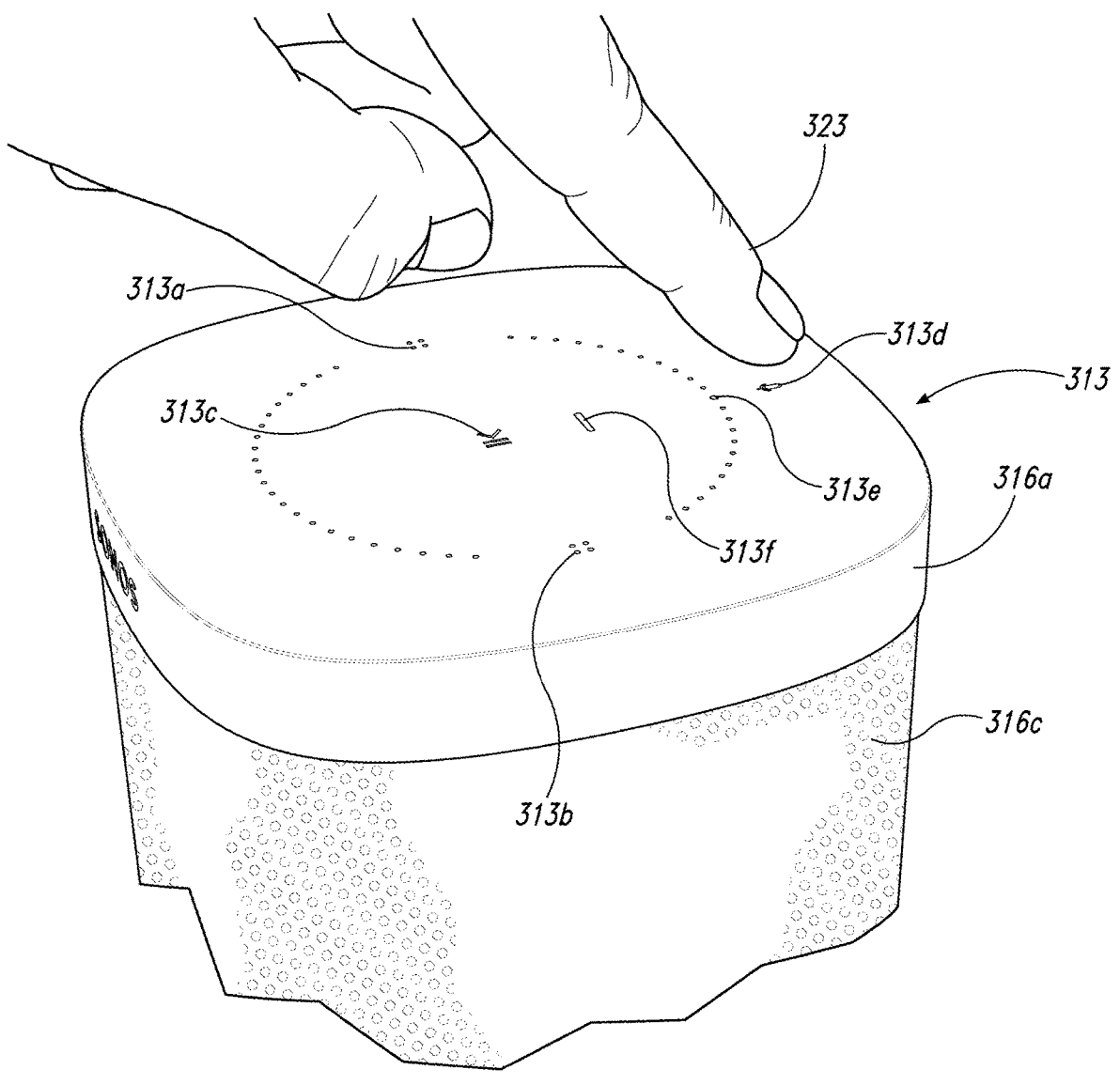
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio content corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
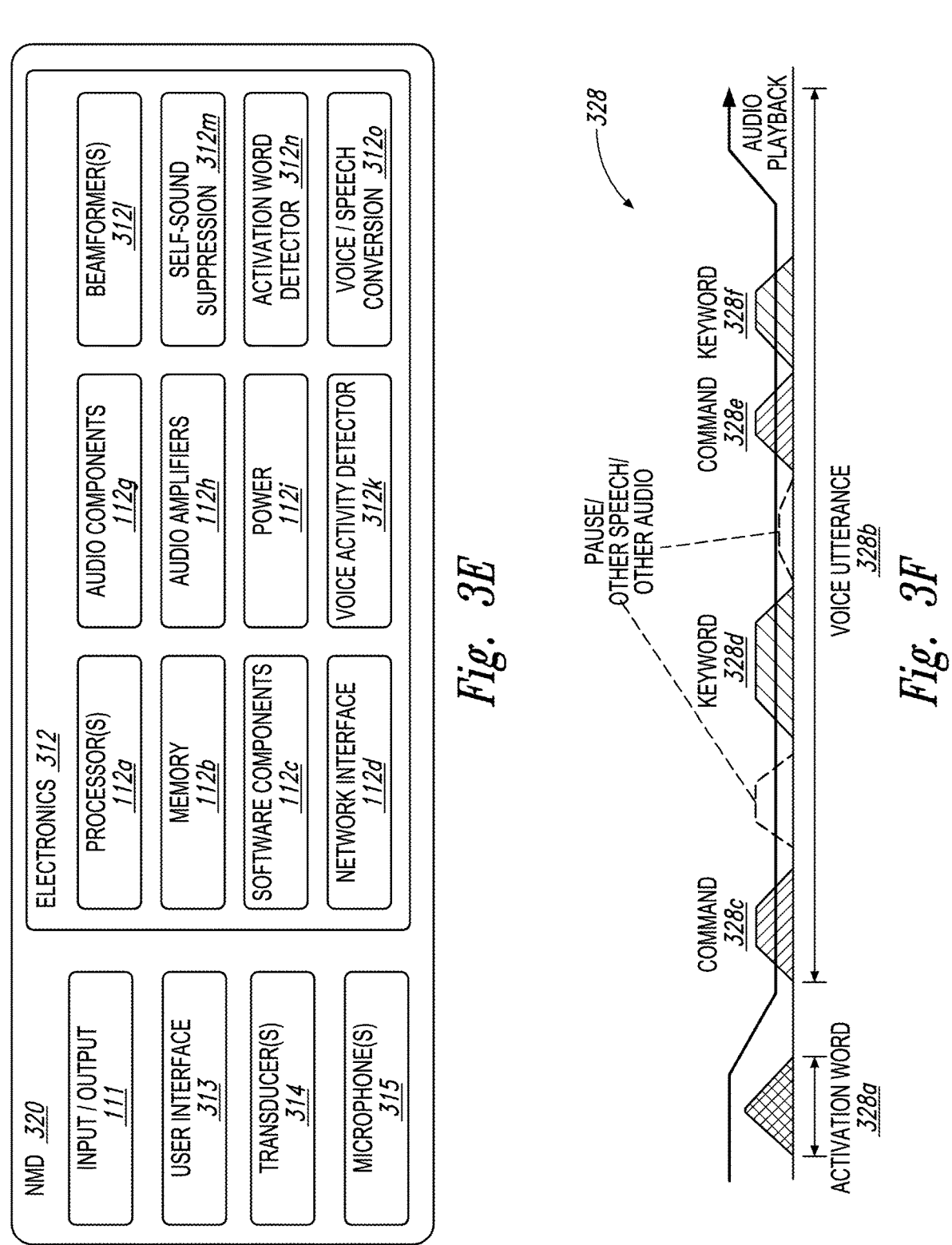
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 3120 (e.g., voice-to-text and text-to-voice). In the illustrated embodiment of FIG. 3E, the foregoing components 312k-3120 are shown as separate components. In some embodiments, however, one or more of the components 312k-3120 are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 3120 may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
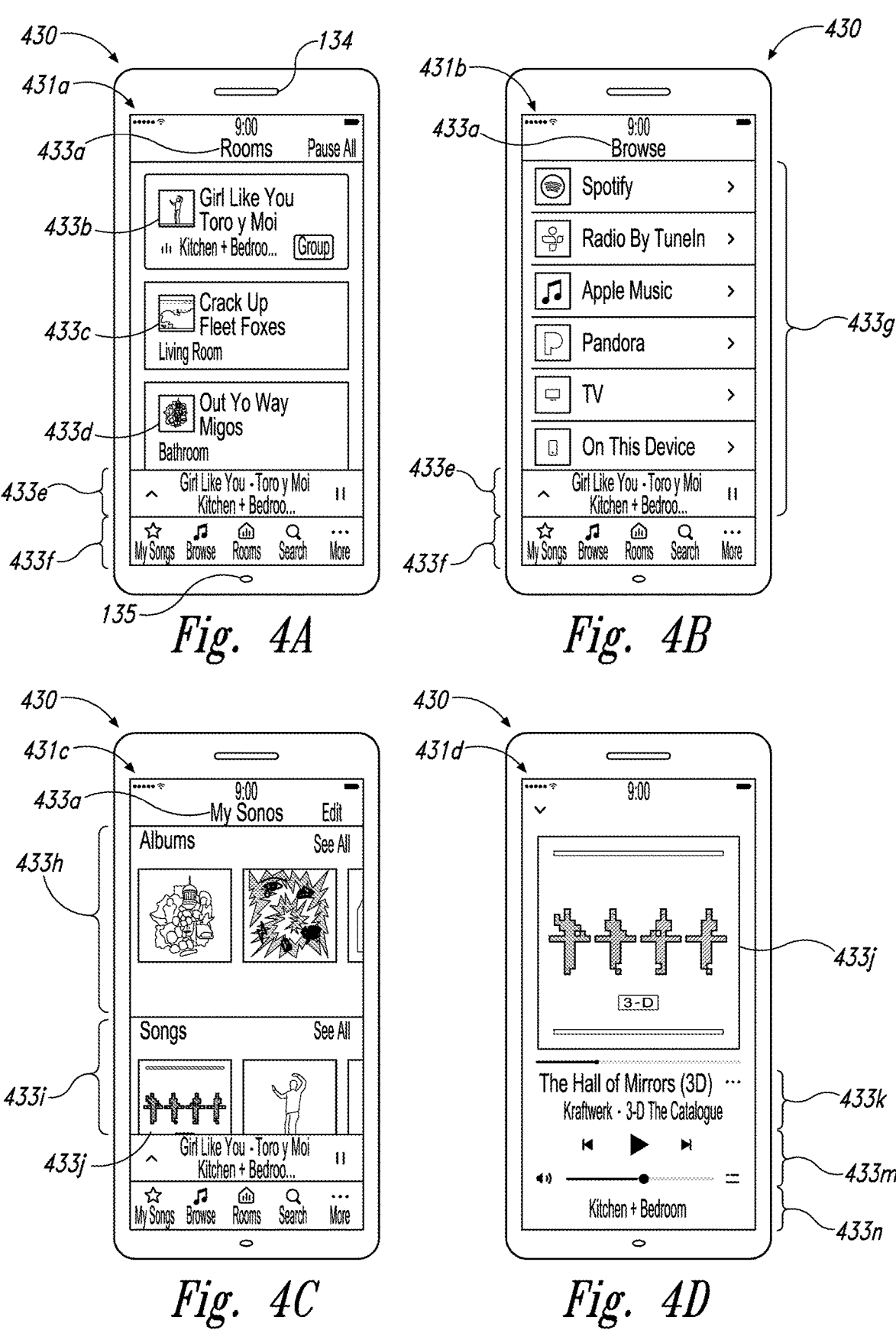
FIGS. 4A-4D show schematic diagrams of a control device in various stages of operation in accordance with aspects of the disclosed technology.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
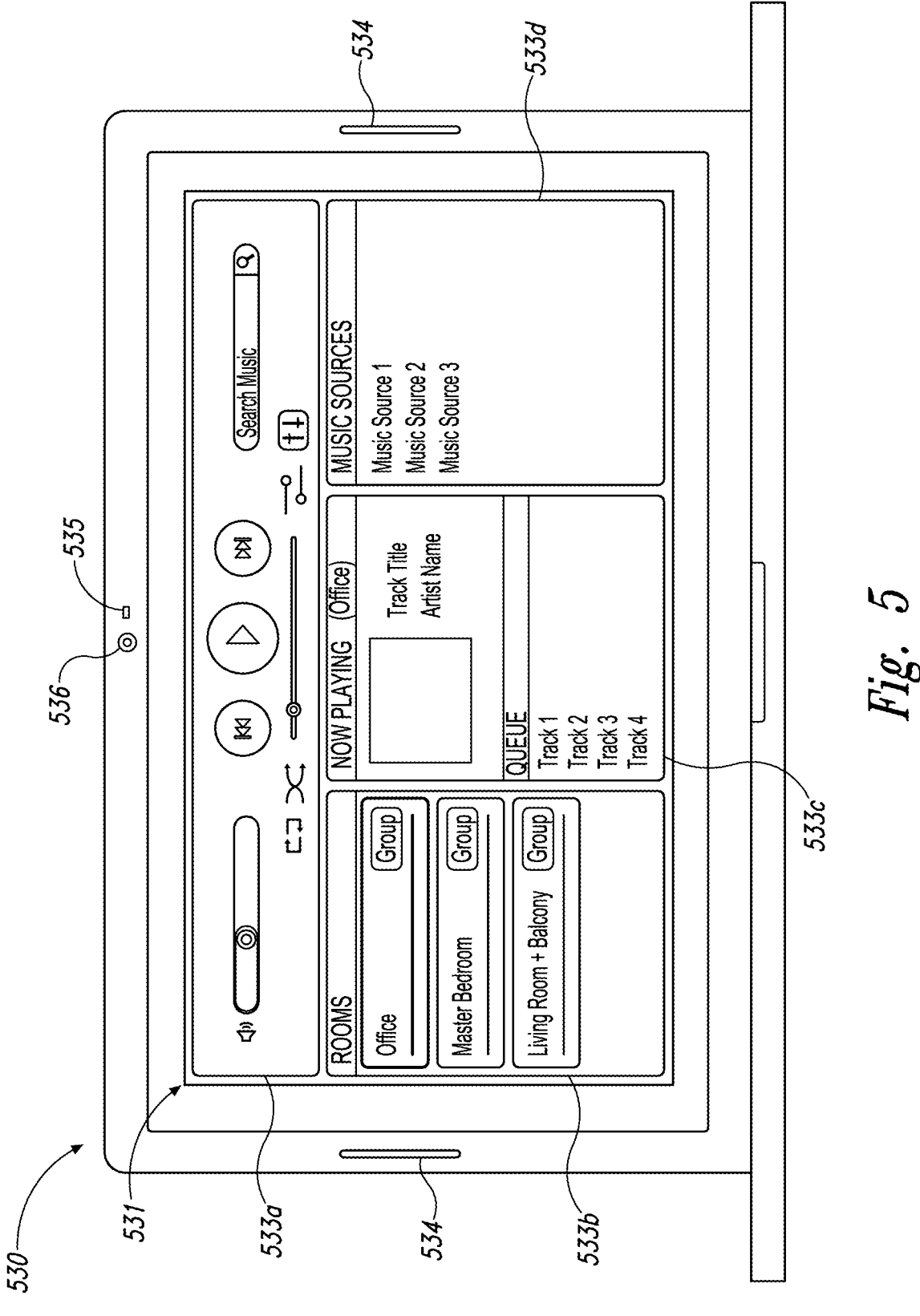
FIG. 5 shows a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, cross-fade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
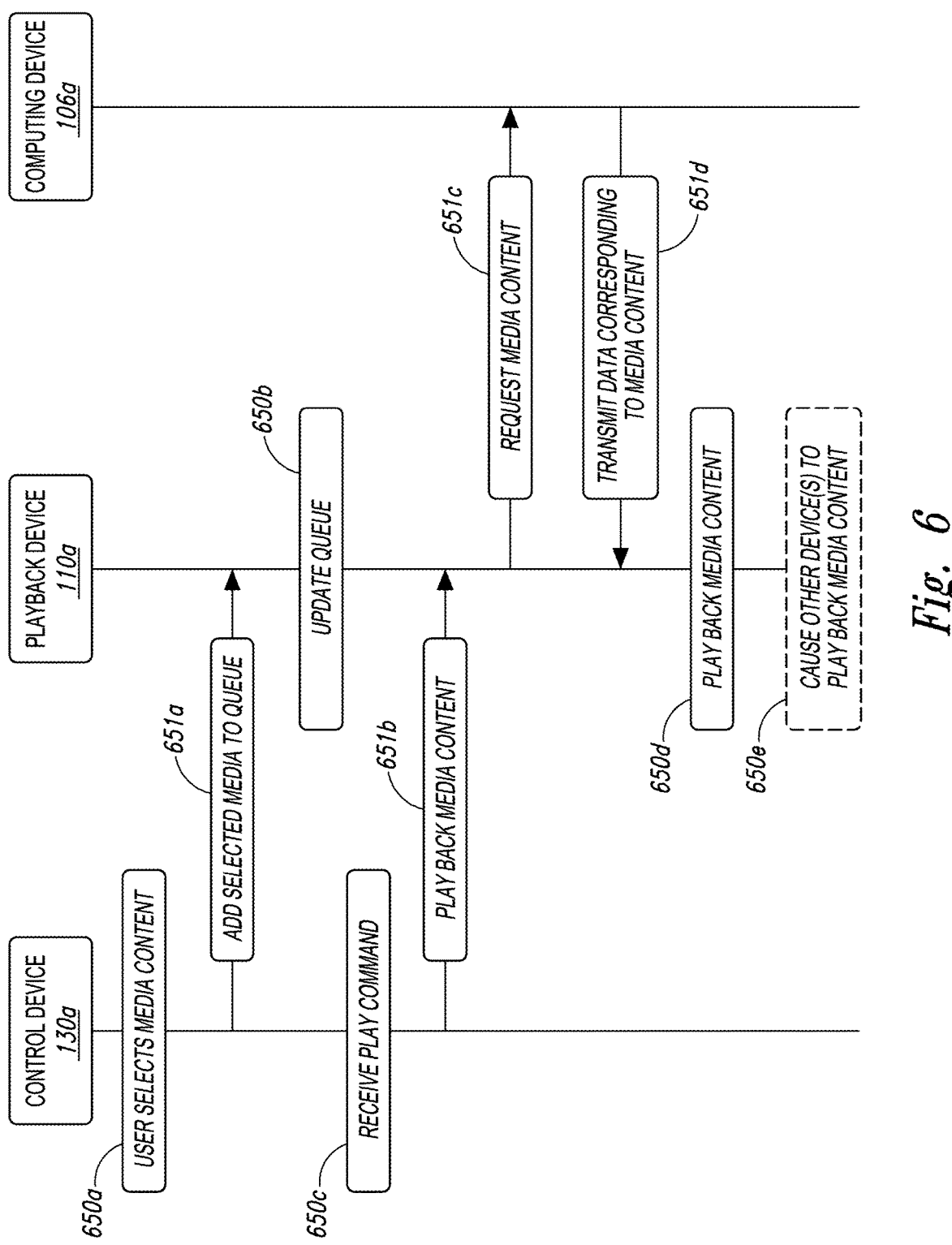
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, playback devices according to some embodiments are configured to, among other features, (i) obtain audio content from an audio content source via a Wireless Local Area Network (WLAN) (e.g., a WiFi network) according to a first communications protocol (e.g., WiFi); (ii) generate playback times for individual portions of the audio content, where the playback time for an individual portion of the audio content is indicative of a future time relative a clock at the first playback device; (iii) generate broadcast times for the individual portions of the audio content based on the playback times for the individual portions of the audio content, where the broadcast time for an individual portion of the audio content is based on the playback time for that individual portion of the audio content; and (iv) based on a current clock time of the clock at the first playback device and the broadcast time for an individual portion of the audio content, broadcast that portion of the audio content to a Personal Area Network (PAN) (e.g., a Bluetooth PAN) according to a second communications protocol (e.g., Bluetooth, including Bluetooth Classic, Bluetooth Low Energy, or similar) that is different than the first communications protocol. Playback devices according to some embodiments are additionally or alternatively configured to output audio content to one or more connected audio accessories.

Wearable devices according to some embodiments are configured to, among other features, (i) via one or more speaker drivers, play audio content received via a first PAN (e.g., via a Bluetooth or similar PAN) from a first playback device; (ii) while playing the audio content received via the first PAN from the first playback device, determine whether the wearable device should switch to receiving the audio content via a second PAN from a second playback device; and (iii) after determining that the wearable device should switch to receiving the audio content via the second PAN from the second playback device, switch to receiving the audio content via the second PAN from the second playback device and play, via the one or more speaker drivers, the audio content received via the second PAN from the second playback device.

V. Technical Features

In some embodiments, at least some aspects of the technical solutions derive from the technical structure and organization of the audio content, the playback timing, and clock timing, including how playback devices (i) generate playback timing for audio content, (ii) generate broadcast timing for audio content, including generating broadcast timing based on the playback timing, (iii) distribute broadcast timing for audio content to other playback devices for broadcast, (iv) generate data output timing for audio content based on the playback timing, (v) distribute data output timing for audio content to other playback devices for output to audio accessories, (vi) play audio content via one or more speakers based on the playback timing and the audio content, (vii) broadcast audio content to wearable devices (sometimes referred to herein as "wearables") for playback based on the broadcast timing, and/or (viii) output audio content to audio accessories based on the data output timing.

Therefore, to aid in understanding certain aspects of the disclosed technical solutions, certain technical details of the audio content, playback timing, and clock timing are described herein, along with certain details of the broadcast timing and data output timing. Except where noted, the technical details of the audio content, playback timing, clock timing, broadcast timing, and data output timing described herein are the same or substantially the same for the examples shown and described herein with reference to FIGS. 7-11.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a streaming video service, or any other source of audio-visual media content now known or later developed; (iv) text-to-speech or other audible content from a voice assistant service (VAS), such as Amazon Alexa or other VAS services now known or later developed; and/or (v) audio content from a telephone, video phone, video/ teleconferencing system or other application configured to allow users to communicate with each other via audio and/or video.

In some embodiments, a playback device configured as a group coordinator (sometimes referred to as a "sourcing" device) for a playback group obtains any of the aforementioned types of audio content from an audio source via an interface on the group coordinator, e.g., one of the group coordinator's network interfaces (e.g., a WiFi, Ethernet, or other type of network interface), a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device configured to operate as a group coordinator for a playback group.

As mentioned earlier, a playback device that receives or otherwise obtains audio content from an audio source for playback and/or distribution to other playback devices and/or wearables in a playback group is sometimes referred to herein as the group coordinator or "sourcing" device for the playback group. One function of the group coordinator of a playback group in some embodiments is to process received audio content for any one or more or of (i) playback by the group coordinator, (ii) distribution to group members of the playback group for groupwise playback (with or without the group coordinator), (iii) broadcast to one or more wearables for playback, (iv) output to one more audio accessories, and/or (v) distribute to group members for broadcast to one or more wearables for playback and/or output to one or more audio accessories.

In some embodiments, the group coordinator transmits the processed audio content to all the other group members in the playback group. In some embodiments, the group coordinator transmits the audio content to a multicast network address, and all the group members configured to play the audio content (i.e., the group members of the playback group) receive the audio content via that multicast address.

In some embodiments, the group coordinator receives audio content from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created (typically created by the audio source or some other device different than the group coordinator). The packet creation time can be used as a sequence number based on an assumption that packets are created in the order in which they should be subsequently played out.

For example, in some embodiments, individual packets from an audio source may include both a timestamp and a sequence number. The timestamp is used to place the incoming packets of audio content in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some embodiments, the group coordinator does not change the sequence number or identifier of a received packet during processing. In some embodiments, the group coordinator reorders at least a first set of packets in a first packet stream received from an audio source (an inbound stream) based on each packet's sequence identifier, extracts audio content from the received packets, reassembles a bitstream of audio content from the received packets, and then repacketizes the reassembled bitstream into a second set of packets (an outbound stream), where packets in the second set of packets have sequence numbers and/or timestamps that differ from the sequence numbers and/or timestamps of the packets in the first set of packets (or first stream).

In some embodiments, individual packets in the second stream are a different length (i.e., shorter or longer) than individual packets in the first stream. In some embodiments, reassembling a bitstream from the incoming packet stream and then subsequently repacketizing the reassembled bitstream into a different set of packets facilitates uniform processing and/or transmission of audio content by the group coordinator and uniform processing by the group members that receive the audio content from the group coordinator.

However, for some delay-sensitive audio content, reassembly and repacketization may be undesirable, and therefore, in some embodiments, the group coordinator may not perform reassembly and repacketization for some (or all) audio content that it receives before playing the audio content and/or transmitting the audio content to other playback devices/group members.

b. Playback Timing

In some embodiments, the playback devices disclosed and described herein use playback timing to play audio content in synchrony with each other.

Some playback devices also use playback timing to generate broadcast timing (described further below) and/or data output timing (described further below). In embodiments where broadcast timing and/or data output timing is based on the playback timing, (i) wearables that receive broadcasts of the audio content (according to the broadcast timing) can play the audio content in synchrony with playback devices that play the audio content in synchrony based on the playback timing and (ii) audio accessories that receive output data comprising audio content (based on the data output timing) can play the audio content in synchrony with playback devices that play the audio content in synchrony based on the playback timing, or perhaps provide the audio content to audio devices communicatively coupled to the audio accessories.

An individual playback device can generate playback timing and/or play audio content according to playback timing, based on the playback device's configuration in the playback group. In some embodiments, the sourcing playback device (acting as a group coordinator) that generates the playback timing for audio content also transmits that generated playback timing to all the playback devices that are configured to play the audio content (the group members).

In some embodiments, the group coordinator transmits playback timing separately from the audio content. In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some embodiments, the playback timing is generated for individual frames (or packets) of audio content. As described above, in some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play the one or more portions of audio content within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated.

In operation, an playback device tasked with playing particular audio content will play the portion(s) of the particular audio content within an individual frame (or packet) at the playback time specified by the playback timing for that individual frame (or packet), as adjusted to accommodate for differences between the clock timing and a clock at the playback device that is tasked with playing the audio content, as described in more detail below.

c. Clock Timing

The playback devices disclosed and described herein use clock timing to generate playback timing for audio content and/or to play the audio content based on the generated playback timing.

In some embodiments, the group coordinator uses clock timing from a reference clock (e.g., a device clock, a digital-to-audio converter clock, a playback time reference clock, or any other clock) to generate playback timing for audio content that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play audio content.

In some embodiments, all of the playback devices tasked with playing particular audio content in synchrony (i.e., all the group members in a playback group) use the same clock timing from the same reference clock to play back that particular audio content in synchrony with each other. In some embodiments, playback devices use the same clock timing to play audio content that was used to generate the playback timing for the audio content. The reference clock may be a local clock of the group coordinator, but the reference clock could also be a clock at a different device, such as a group member or a computing device (e.g., a smartphone, tablet computer, smartwatch, or other computing device).

In operation, the device that generates the clock timing also transmits the clock timing to all the playback devices that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio content (e.g., the group coordinator and/or the group members) receive the clock timing via that multicast address. In some embodiments, the device that generates the clock timing alternatively transmits the clock timing to each unicast network address of each playback device in the playback group.

In some embodiments, the device that generates the clock timing is the playback device configured to operate as the group coordinator for the playback group. And in operation, the group coordinator of the playback group transmits the clock timing to all the group members of the playback group. The group coordinator and the group members all use the clock timing and the playback timing to play audio content in a groupwise manner. In some embodiments, the group coordinator and the group members all use the clock timing and the playback timing to play audio content in synchrony with each other.

d. Broadcast Timing

In some embodiments, playback devices disclosed and described herein generate broadcast timing for audio content, distribute broadcast timing for the audio content to other playback devices in a playback group, and/or use the broadcast timing for the audio content to broadcast the audio content via personal area networks (PANs) operated by the playback devices. Wearable devices (or "wearables") within wireless reception range of an individual playback device's PAN can subscribe to and receive the audio content broadcasted by the playback device (broadcasted according to the broadcast timing), and play the received audio content. In some embodiments, a wearable plays audio content received via a playback device's PAN upon receipt (or substantially upon receipt).

An individual playback device can generate broadcast timing and/or broadcast audio content according to broadcast timing, based on the playback device's configuration in the playback group.

For example, in some embodiments, the group coordinator (i) generates broadcast timing for audio content, (ii) distributes the broadcast timing for the audio content to the group members in a playback group, and (iii) broadcasts audio content via its PAN interface according to the broadcast timing. In such embodiments, the group members that receive the broadcast timing from the group coordinator also broadcast the audio content via their respective PAN interfaces according to the broadcast timing.

In some embodiments, the group coordinator transmits broadcast timing separately from the audio content. In some embodiments, the group coordinator transmits the broadcast timing to all the group members by transmitting the broadcast timing to a multicast network address for the playback group, and all the group members receive the broadcast timing via the playback group's multicast address. In some embodiments, the group coordinator transmits the broadcast timing to each group member by transmitting the broadcast timing to each group member's unicast network address.

In some embodiments, the broadcast timing is generated for individual frames (or packets) of audio content. As described above, in some embodiments, the audio content is packaged in a series of frames (or packets) where individual frames (or packets) comprise a portion of the audio content. In some embodiments, the broadcast timing for the audio content includes a broadcast time for each frame (or packet) of audio content. In some embodiments, the broadcast timing for an individual frame (or packet) is included within the frame (or packet), e.g., in the header of the frame (or packet), in an extended header of the frame (or packet), and/or in the payload portion of the frame (or packet). In some embodiments, an individual frame comprising audio content includes both a playback time for the audio content and a broadcast time for the audio content.

In some embodiments, the broadcast time for an individual frame (or packet) is identified by a timestamp or other indication. In such embodiments, the timestamp (or other indication) represents a time at which the playback device is to broadcast the one or more portions of audio content within that individual frame (or packet).

In operation, when the broadcast timing for an individual frame (or packet) is generated, the broadcast timing for that individual frame (or packet) is a future time relative to a current clock time of a reference clock at the time that the broadcast timing for that individual frame (or packet) is generated.

In operation, a playback device tasked with broadcasting particular audio content will broadcast the portion(s) of the particular audio content within an individual frame (or packet) at the broadcast time specified by the broadcast timing for that individual frame (or packet), as adjusted to accommodate for differences between the clock timing and a clock at the playback device that is tasked with broadcasting the audio content.

In alternative embodiments, rather than distributing a broadcast time for each frame (or packet) of audio to be broadcasted by the playback group, the group coordinator may instead generate a broadcast time offset relative to the playback timing, and inform the group members in the playback group of the broadcast time offset. The group coordinator and the group members then use the broadcast time offset to determine broadcast timing for each frame of audio content by adjusting the playback time for each frame by the broadcast time offset. Depending on the specific implementation, the broadcast time offset may be positive or negative.

Regardless of whether the broadcast timing is distributed for each frame of audio content or calculated based on an offset relative to the playback timing, the goal is to have all of the playback devices in the playback group broadcast the audio content via their PAN interfaces in synchrony so that wearable devices (or "wearables") within wireless reception range of a playback device's PAN broadcasts can tune in to the broadcast stream, subscribe to the broadcast stream, join the broadcast stream, pair with the broadcasting playback device, or otherwise configure themselves to receive the broadcasted audio content from a playback device. And after receiving the audio content via the broadcast, the wearables play the audio content, including playing the audio content in synchrony with (or at least substantially in synchrony with) other wearables and/or the playback device (and any other playback device(s) configured to play the audio content in synchrony with the playback device).

e. Data Output Timing

In some embodiments, playback devices disclosed and described herein additionally or alternatively generate data output timing for audio content, distribute data output timing for the audio content to other playback devices in a playback group, and/or use the data output timing for the audio content to output the audio content via a data output interface to an audio accessory. Audio accessories may include any device now known or later developed that is configured to receive audio content from another device (e.g., a playback device) and either (i) play the audio content or (ii)

provide the audio content to another device configured to play audio content received from the audio accessory. One example of such an audio accessory is a base station or hub for a hearing aid device, where the base station or hub receives audio content from a playback device and transmits the audio content to the hearing aid.

An individual playback device can generate data output timing and/or output audio content to an audio accessory according to data output timing, based on the playback device's configuration in the playback group.

For example, in some embodiments, the group coordinator (i) generates data output timing for audio content, (ii) distributes the data output timing for the audio content to the group members in a playback group, and (iii) outputs audio content to any connected audio accessory according to the data output timing. In such embodiments, the group members that receive the data output timing from the group coordinator also output audio content to any connected audio accessories according to the data output timing.

In some embodiments, the group coordinator transmits data output timing separately from the audio content. In some embodiments, the group coordinator transmits the data output timing to all the group members by transmitting the data output timing to a multicast network address for the playback group, and all the group members receive the data output timing via the playback group's multicast address. In some embodiments, the group coordinator transmits the data output timing to each group member by transmitting the data output timing to each group member's unicast network address.

In some embodiments, the group coordinator only transmits data output timing to group members that request data output timing from the group coordinator. For example, a playback device may request that the group coordinator provide data output timing only if the playback device has a connected audio accessory. If only one playback device has a connected audio accessory, and only that one playback device requests that the group coordinator provide data output timing, then the group coordinator in such embodiments may transmit data output timing only to the playback device that requested data output timing. If no playback devices in a playback group have a connected audio accessory, and thus, no playback devices request that the group coordinator provide data output timing, then the group coordinator need not generate data output timing or transmit data output timing to any group members. However, in other embodiments, the group coordinator generates and distributes data output timing regardless of whether any playback devices in the playback group have connected audio accessories.

In some embodiments, the data output timing is generated for individual frames (or packets) of audio content. As described above, in some embodiments, the audio content is packaged in a series of frames (or packets) where individual frames (or packets) comprise a portion of the audio content. In some embodiments, the data output timing for the audio content includes a data output time for each frame (or packet) of audio content. In some embodiments, the data output timing for an individual frame (or packet) is included within the frame (or packet), e.g., in the header of the frame (or packet), in an extended header of the frame (or packet), and/or in the payload portion of the frame (or packet). In some embodiments, an individual frame comprising audio content includes playback time for the audio content, a broadcast time for the audio content, and a data output time for the audio content.

In some embodiments, the data output time for an individual frame (or packet) is identified by a timestamp or other indication. In such embodiments, the timestamp (or other indication) represents a time at which the playback device is to output the one or more portions of audio content within that individual frame (or packet) to a connected audio accessory.

In operation, when the data output timing for an individual frame (or packet) is generated, the data output timing for that individual frame (or packet) is a future time relative to a current clock time of a reference clock at the time that the data output timing for that individual frame (or packet) is generated.

In operation, a playback device tasked with outputting particular audio content to a connected audio accessory will output the portion(s) of the particular audio content within an individual frame (or packet) at the data output time specified by the data output timing for that individual frame (or packet), as adjusted to accommodate for differences between the clock timing and a clock at the playback device that is tasked with outputting the audio content to the connected audio accessory.

In alternative embodiments, rather than distributing a data output time for each frame (or packet) of audio to be output by one or more playback devices connected to audio accessories, the group coordinator may instead generate a data output time offset relative to the playback timing, and inform one or more group members in the playback group of the data output time offset. The group coordinator and/or the relevant group members can then use the data output time offset to determine data output timing for each frame of audio content by adjusting the playback time for each frame by the data output time offset. Depending on the specific implementation, the data output time offset may be positive or negative.

Regardless of whether the data output timing is distributed for each frame of audio content or calculated based on an offset relative to the playback timing, the goal is to have all of the playback devices in the playback group output the audio content to connected audio accessories in synchrony so that the audio accessories can receive the audio content at substantially the same time. And after receiving audio content from a playback device via a data output interface, an audio accessory either or both (i) plays the audio content, including playing the audio content in synchrony with (or at least substantially in synchrony with) the playback device (and any other playback device(s) configured to play the audio content in synchrony with the playback device), and/or (ii) provides the audio content to an audio device (e.g., a hearing aid device) in communication with the audio accessory so that the audio device can play the audio content, including playing the audio content in synchrony with (or at least substantially in synchrony with) the playback device that provided the audio content to the audio accessory (and any other playback device(s) configured to play the audio content in synchrony with the playback device).

f. Generating Playback Timing by the Group Coordinator

In some embodiments, the group coordinator: (i) generates playback timing for audio content based on clock timing from a local clock at the group coordinator, and (ii) transmits the generated playback timing to all the other group members in the playback group. In operation, when generating playback timing for an individual frame (or packet), the group coordinator adds a "playback timing advance" to the current clock time of a local clock at the group coordinator that the group coordinator is using for generating the playback timing.

In some embodiments, the "playback timing advance" is based on an amount of time that is greater than or equal to the sum of (i) the network transit time required for frames and/or packets comprising audio content transmitted from the group coordinator to arrive at all the other group members and (ii) the amount of time required for all the other group members to process received frames/packets from the group coordinator for playback.

In some embodiments, the group coordinator determines a playback timing advance by sending one or more test packets to one or more (or perhaps all) of the other group members, and then receiving test response packets back from those one or more group members. In some embodiments, the group coordinator and the one or more group members negotiate a playback timing advance via multiple test and response messages. In some embodiments with more than two group members, the group coordinator determines a playback timing advance by exchanging test and response messages with all of the group members, and then setting a playback timing advance that is sufficient for the group member having the longest total of network transmit time and packet processing time.

In some embodiments, the playback timing advance is less than about 50 milliseconds. In some embodiments, the playback timing advance is less than about 20-30 milliseconds. And in still further embodiments, the playback timing advance is less than about 10 milliseconds. In some embodiments, the playback timing advance remains constant after being determined, or at least constant for the duration of a synchronous playback session. In other embodiments, the group coordinator can change the playback timing advance in response to a request from a group member indicating that a greater playback timing advance is required (e.g., because the group member is not receiving packets comprising portions of audio content until after one or more other group members have already played the portions of audio content) or a shorter playback timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

g. Generating Playback Timing with Clock Timing from a Remote Clock

In some embodiments, the group coordinator may generate playback timing for audio content based on clock timing from a "remote" clock at another network device, e.g., another playback device, another computing device (e.g., a smartphone, tablet computer, smartwatch, or other computing device configurable to provide clock timing sufficient for use by the group coordinator generate playback timing and/or playback audio content). Generating playback timing based on clock timing from a remote clock at another network device can be more complicated than generating playback timing based on clock timing from a local clock in embodiments where the same clock timing is used for both (i) generating playback timing and (ii) playing audio content based on the playback timing.

In embodiments where the group coordinator generates playback timing for audio content based on clock timing from a remote cock, the playback timing for an individual frame (or packet) is based on (i) a "clock timing offset" between (a) a local clock at the group coordinator that the group coordinator uses for generating the playback timing and (b) the clock timing from the remote reference clock, and (ii) a "playback timing advance" based on an amount of time that is greater than or equal to the sum of (a) the network transit time required for packets transmitted from the group coordinator to arrive at the group members and (b) the amount of time required for all of those group members to process frames and/or packets comprising audio content received from the group coordinator for playback.

For an individual frame (or packet) containing a portion(s) of the audio content, the group coordinator in some embodiments generates playback timing for that individual frame (or packet) by adding the sum of the "clock timing offset" and the "playback timing advance" to a current time of the local clock at the group coordinator that the group coordinator uses to generate the playback timing for the audio content. In operation, the "clock timing offset" may be a positive or a negative offset, depending on whether the local clock at the group coordinator is ahead of or behind the remote clock providing the clock timing. The "playback timing advance" is a positive number because it represents a future time relative to the local clock time, as adjusted by the "clock timing offset."

By adding the sum of the "playback timing advance" and the "clock timing offset" to a current time of the local clock at the group coordinator that the group coordinator is using to generate the playback timing for the audio content, the group coordinator is, in effect, generating the playback timing relative to the remote clock.

In some embodiments, and as described above, the "playback timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for playback.

In some embodiments, the group coordinator determines a playback timing advance via signaling between the group coordinator and one or more group members, as described previously. Further, in some embodiments, the playback timing advance is less than about 50 milliseconds, less than about 20-30 milliseconds, or less than about 10 milliseconds, depending on the audio content playback latency requirements because different audio content may have different latency requirements.

For example, audio content having associated video content may have lower latency requirements than audio content that does not have associated video content because audio content associating with video content must be synchronized with its corresponding video content whereas audio content that is not associated with video content need not be synchronized with any corresponding video content.

In some embodiments, the playback timing advance remains constant after being determined, or at least constant for the duration of a playback session. And in some embodiments, the group coordinator can change the playback timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

h. Generating Broadcast Timing by the Group Coordinator

In some embodiments, a playback device functioning as the group coordinator for a playback group: (i) generates broadcast timing for audio content based on clock timing from a local clock at the group coordinator, and (ii) transmits the generated broadcast timing to all the other group members in the playback group (or at least to all the playback devices that are configured to broadcast the audio content to wearables). In such embodiments, when generating broadcast timing for an individual frame (or packet), the group coordinator adds a "broadcast timing advance" to the current clock time of a local clock at the group coordinator that the group coordinator is using for generating the broadcast timing.

In some embodiments, the "broadcast timing advance" is based on an amount of time that is greater than or equal to the sum of (i) the network transit time required for frames and/or packets comprising audio content transmitted from the group coordinator to arrive at all the other group members that are configured to broadcast audio content and (ii) the amount of time required for all the other group members to process received frames/packets from the group coordinator for broadcast to wearables via a PAN interface.

In some embodiments, the group coordinator determines a broadcast timing advance by sending one or more test packets to one or more (or perhaps all) of the other group members, and then receiving test response packets back from those one or more group members. In some embodiments, the group coordinator and the one or more group members negotiate a broadcast timing advance via multiple test and response messages. In some embodiments with more than two group members, the group coordinator determines a broadcast timing advance by exchanging test and response messages with all of the group members, and then setting a broadcast timing advance that is sufficient for the group member having the longest total of network transmit time and packet processing time.

In some embodiments, the broadcast timing advance is less than about 50 milliseconds. In some embodiments, the broadcast timing advance is less than about 20-30 milliseconds. And in still further embodiments, the broadcast timing advance is less than about 10 milliseconds. In some embodiments, the broadcast timing advance remains constant after being determined, or at least constant for the duration of a synchronous broadcast session. In other embodiments, the group coordinator can change the broadcast timing advance in response to a request from a group member indicating that a greater broadcast timing advance is required (e.g., because the group member is not receiving packets comprising portions of audio content until after one or more other group members have already broadcasted the portions of audio content) or a shorter broadcast timing advance would be sufficient (e.g., because the group member is buffering more packets comprising portions of audio content than necessary to provide consistent, reliable broadcast).

In some embodiments, the broadcast timing for an individual frame of audio content is based on the playback timing for that individual frame of audio content (regardless of how the playback timing may have been determined). For example, if the group coordinator has already determined playback timing for individual frames of audio content, the group coordinator can generate broadcast timing for each frame of audio content based on that individual frame's playback timing. In some embodiments, because a wearable that receives audio broadcasted from a playback device must process the received audio for playback, the broadcast time for an individual frame of audio content is typically earlier than the playback time for that individual frame of audio content. Making the broadcast time earlier than the playback time allows sufficient time for the wearable to receive and process the audio content broadcasted by a playback device, and then play the audio content in synchrony with the playback device (and any other playback devices in the playback group). However, in other scenarios, the broadcast time for an individual frame of audio content may instead be later than the playback time for that individual frame of audio content.

In some embodiments, rather than determining a broadcast time for each frame of audio content, the group coordinator may instead determine a broadcast time offset relative to the playback timing and distribute the broadcast time offset to all of the playback devices in the playback group. Each playback device in the playback group (or at least each playback device configured to broadcast audio content) can then use that broadcast time offset to determine the broadcast times for individual frames of audio content. As noted above, because a wearable that receives audio broadcasted from a playback device must process the received audio for playback, the broadcast time for an individual frame of audio content is typically earlier than the playback time for that individual frame of audio content. Thus, the broadcast time offset is typically a negative value. Adding the negative broadcast time offset value to the playback time for an individual frame of audio content, causes the broadcast time for the frame to be earlier than the playback time for the frame of audio content. However, in other scenarios, the broadcast time for an individual frame of audio content may instead be later than the playback time for that individual frame of audio content.

As described in more detail below, all the playback devices in a playback group configured to broadcast the audio content in synchrony will use the broadcast timing and the clock timing to broadcast the audio content in synchrony with each other for receipt by (and subsequent playback by) any wearables connected to a PAN operated by a playback device in the playback group.

i. Generating Broadcast Timing with Clock Timing from a Remote Clock

In some embodiments, the group coordinator may generate broadcast timing for audio content based on clock timing from a "remote" clock at another network device, e.g., another playback device, another computing device (e.g., a smartphone, tablet computer, smartwatch, or other computing device configurable to provide clock timing sufficient for use by the group coordinator generate broadcast timing and/or broadcast audio content). Generating broadcast timing based on clock timing from a remote clock at another network device can be more complicated than generating broadcast timing based on clock timing from a local clock in embodiments where the same clock timing is used for both (i) generating broadcast timing and (ii) broadcasting audio content based on the broadcast timing.

In embodiments where the group coordinator generates broadcast timing for audio content based on clock timing from a remote cock, the broadcast timing for an individual frame (or packet) is based on (i) a "clock timing offset" between (a) a local clock at the group coordinator that the group coordinator uses for generating the broadcast timing and (b) the clock timing from the remote reference clock, and (ii) a "broadcast timing advance" based on an amount of time that is greater than or equal to the sum of (a) the network transit time required for packets transmitted from the group coordinator to arrive at the group members and (b) the amount of time required for all of those group members to process frames and/or packets comprising audio content received from the group coordinator for broadcast.

For an individual frame (or packet) containing a portion(s) of the audio content, the group coordinator generates broadcast timing for that individual frame (or packet) by adding the sum of the "clock timing offset" and the "broadcast timing advance" to a current time of the local clock at the group coordinator that the group coordinator uses to generate the broadcast timing for the audio content. In operation, the "clock timing offset" may be a positive or a negative offset, depending on whether the local clock at the group coordinator is ahead of or behind the remote clock providing the clock timing. The "broadcast timing advance" is a positive number because it represents a future time relative to the local clock time, as adjusted by the "clock timing offset."

By adding the sum of the "broadcast timing advance" and the "clock timing offset" to a current time of the local clock at the group coordinator that the group coordinator is using to generate the broadcast timing for the audio content, the group coordinator is, in effect, generating the broadcast timing relative to the remote clock.

In some embodiments, and as described above, the "broadcast timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for broadcast.

In some embodiments, the group coordinator determines a broadcast timing advance via signaling between the group coordinator and one or more group members, as described previously. Further, in some embodiments, the broadcast timing advance is less than about 50 milliseconds, less than about 20-30 milliseconds, or less than about 10 milliseconds, depending on the audio content playback latency requirements because different audio content may have different latency requirements.

For example, audio content having associated video content may have lower latency requirements than audio content that does not have associated video content because audio content associating with video content must be synchronized with its corresponding video content whereas audio content that is not associated with video content need not be synchronized with any corresponding video content.

In some embodiments, the broadcast timing advance remains constant after being determined, or at least constant for the duration of a broadcast session. And in some embodiments, the group coordinator can change the broadcast timing advance based on further signaling between the group coordinator (generating the broadcast timing) and one or more group members (that are using the broadcast timing to broadcast audio content to wearables).

As described in more detail below, all the playback devices configured to broadcast the audio content in synchrony will use the broadcast timing and the clock timing to broadcast the audio content in synchrony with each other for receipt by (and subsequent playback by) any wearables connected to a PAN operated by a playback device in the playback group.

j. Generating Data Output Timing by the Group Coordinator

In some embodiments, a playback device configured to operate as the group coordinator for a playback group: (i) generates data output timing for audio content based on clock timing from a local clock at the group coordinator, and (ii) transmits the generated data output timing to one or more (or all) the other group members in the playback group. In such embodiments, when generating data output timing for an individual frame (or packet), the group coordinator adds a "data output timing advance" to the current clock time of a local clock at the group coordinator that the group coordinator is using for generating the data output timing.

In some embodiments, the "data output timing advance" is based on an amount of time that is greater than or equal to the sum of (i) the network transit time required for frames and/or packets comprising audio content transmitted from the group coordinator to arrive at all the other group members and (ii) the amount of time required for all the other group members to process received frames/packets from the group coordinator for outputting the audio content to an audio accessory.

In some embodiments, the group coordinator determines a data output timing advance by sending one or more test packets to one or more (or perhaps all) of the other group members, and then receiving test response packets back from those one or more group members. In some embodiments, the group coordinator and the one or more group members negotiate a data output timing advance via multiple test and response messages. In some embodiments with more than two group members, the group coordinator determines a data output timing advance by exchanging test and response messages with all of the group members, and then setting a data output timing advance that is sufficient for the group member having the longest total of network transit time and packet processing time.

In some embodiments, the data output timing advance is less than about 50 milliseconds. In some embodiments, the data output timing advance is less than about 20-30 milliseconds. And in still further embodiments, the data output timing advance is less than about 10 milliseconds. In some embodiments, the data output timing advance remains constant after being determined, or at least constant for the duration for some duration of time. In other embodiments, the group coordinator can change the data output timing advance in response to a request from a group member indicating that a greater data output timing advance is required (e.g., because the group member is not receiving packets comprising portions of audio content until after one or more other group members have already output the portions of audio content to a connected audio accessory) or a shorter timing advance would be sufficient (e.g., because the group member is buffering more packets comprising portions of audio content than necessary to provide consistent, reliable data output to a connected audio accessory).

In some embodiments, the data output timing for an individual frame of audio content is based on the playback timing for that individual frame of audio content (regardless of how the playback timing may have been determined). For example, if the group coordinator has already determined playback timing for individual frames of audio content, the group coordinator can generate data output timing for each frame of audio content based on that individual frame's playback timing. In some embodiments, because a connected audio accessory that receives audio output from a playback device must process the received audio for playback or subsequent transmission to another audio device (e.g., a hearing aid or other audio device in communication with the audio accessory), the data output time for an individual frame of audio content is typically earlier than the playback time for that individual frame of audio content. However, in other scenarios, the data output time for an individual frame of audio content may instead be later than the playback time for that individual frame of audio content.

In some embodiments, rather than determining a data output time for each frame of audio content, the group coordinator may instead determine a data output time offset relative to the playback timing and distribute the data output time offset to the playback devices in the playback group that have connected audio accessories. Each playback device in the playback group that has a connected audio accessory can then use that data output time offset to determine the data output time for individual frames of audio content.

As noted above, because an audio accessory that receives audio output from a playback device must process the received audio for playback and/or subsequent transmission, the data output time for an individual frame of audio content is typically earlier than the playback time for that individual frame of audio content. Thus, the data output time offset is typically a negative value. Adding the negative data output time offset value to the playback time for an individual frame of audio content causes the data output time for the frame to be earlier than the playback time for the frame of audio content. However, in other scenarios, the data output time for an individual frame of audio content may instead be later than the playback time for that individual frame of audio content.

As described in more detail below, all the playback devices in a playback group configured to output the audio content in synchrony will use the data output timing and the clock timing to output the audio content in synchrony with each other for receipt by (and subsequent playback and/or retransmission by) a connected audio accessory.

In some embodiments, a first playback device may be connected to a first type of audio accessory and a second playback device may be connected to a second type of audio accessory. If the time required for the first audio accessory to process and retransmit audio content output from the first playback device is different than the time required for the second audio accessory to process and retransmit audio content output from the second playback device, then the data output time for a packet of audio content output from the first playback device to the first connected audio accessory should be different than the data output time for that same packet of audio content output from the second playback device to the second connected audio accessory. Therefore, in some embodiments, the data output time for an individual packet of audio content may be different at different playback devices in a playback group based on the type(s) of audio accessories connected to the different playback devices in the playback group. In such embodiments, each playback device with a connected audio accessory may additionally implement a data output time adjustment to the data output timing, where the data output time adjustment is based on the processing time required by the specific audio accessory connected to that particular playback device.

k. Generating Data Output Timing with Clock Timing from a Remote Clock

In some embodiments, the group coordinator may generate data output timing for audio content based on clock timing from a "remote" clock at another network device, e.g., another playback device, another computing device (e.g., a smartphone, tablet computer, smartwatch, or other computing device configurable to provide clock timing sufficient for use by the group coordinator generate data output timing and/or output audio content to a connected audio accessory). Generating data output timing based on clock timing from a remote clock at another network device can be more complicated than generating data output timing based on clock timing from a local clock in embodiments where the same clock timing is used for both (i) generating data output timing and (ii) outputting audio content to a connected audio accessory based on the data output timing.

In embodiments where the group coordinator generates data output timing for audio content based on clock timing from a remote cock, the data output timing for an individual frame (or packet) is based on (i) a "clock timing offset" between (a) a local clock at the group coordinator that the group coordinator uses for generating the data output timing and (b) the clock timing from the remote reference clock, and (ii) a "data output timing advance" based on an amount of time that is greater than or equal to the sum of (a) the network transit time required for packets transmitted from the group coordinator to arrive at the group members and (b) the amount of time required for the relevant group members to process frames and/or packets comprising audio content received from the group coordinator for output to their connected audio accessories.

For an individual frame (or packet) containing a portion (s) of the audio content, the group coordinator generates data output timing for that individual frame (or packet) by adding the sum of the "clock timing offset" and the "data output timing advance" to a current time of the local clock at the group coordinator that the group coordinator uses to generate the data output timing for the audio content. In operation, the "clock timing offset" may be a positive or a negative offset, depending on whether the local clock at the group coordinator is ahead of or behind the remote clock providing the clock timing. The "data output timing advance" is a positive number because it represents a future time relative to the local clock time, as adjusted by the "clock timing offset."

By adding the sum of the "broadcast timing advance" and the "clock timing offset" to a current time of the local clock at the group coordinator that the group coordinator is using to generate the data output timing for the audio content, the group coordinator is, in effect, generating the data output timing relative to the remote clock.

In some embodiments, and as described above, the "data output timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for broadcast.

In some embodiments, the group coordinator determines a data output timing advance via signaling between the group coordinator and one or more group members, as described previously. Further, in some embodiments, the data output timing advance is less than about 50 milliseconds, less than about 20-30 milliseconds, or less than about 10 milliseconds, depending on the audio content playback latency requirements because different audio content may have different latency requirements.

For example, audio content having associated video content may have lower latency requirements than audio content that does not have associated video content because audio content associating with video content must be synchronized with its corresponding video content whereas audio content that is not associated with video content need not be synchronized with any corresponding video content.

In some embodiments, the data output timing advance remains constant after being determined, or at least constant for some duration of time. And in some embodiments, the group coordinator can change the data output timing advance based on further signaling between the group coordinator (generating the data output timing) and one or more group members (that are using the data output timing to output audio content to connected audio accessories).

In some embodiments, the playback devices configured to output the audio content in synchrony will use the data output timing and the clock timing to output the audio content in synchrony with each other for receipt by (and subsequent retransmission by) audio accessories connected to playback devices in the playback group. In some embodiments, each playback device with a connected audio accessory may additionally implement a data output time adjustment to the data output timing, where the data output time adjustment is based on the processing time required by the specific audio accessory connected to that particular playback device l. Playing, Broadcasting, and/or Outputting Audio Content Using Local Playback Timing and Local Clock Timing In some embodiments, the group coordinator is configured to one or more of (i) play audio content in synchrony with one or more group members, (ii) broadcast audio content in synchrony with one or more group members, and/or (iii) output audio content to a connected audio accessory in synchrony with one or more group members.

If the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio content when the local clock that the group coordinator used to generate the playback timing reaches the time specified in the playback timing for that individual frame (or packet).

For example, recall that when generating playback timing for an individual frame (or packet), the group coordinator device adds a "playback timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio content in an individual frame (or packet) 30 milliseconds after creating the playback timing for that individual frame (or packet).

In this manner, the group coordinator plays audio content by using locally-generated playback timing and clock timing from a local reference clock at the group coordinator. By playing the portion(s) of the audio content of an individual frame and/or packet when the clock time of the local reference clock reaches the playback timing for that individual frame or packet, the group coordinator plays that portion(s) of the audio content in that individual frame and/or packet in synchrony with other group members in the playback group.

Similarly, if the group coordinator is using clock timing from a local clock at the group coordinator to generate the broadcast timing, then the group coordinator will broadcast the audio content using locally-generated playback timing and the locally-generated clock timing. In operation, the group coordinator broadcasts an individual frame (or packet) comprising portions of the audio content when the local clock that the group coordinator used to generate the broadcast timing reaches the time specified in the broadcast timing for that individual frame (or packet).

For example, recall that when generating broadcast timing for an individual frame (or packet), the group coordinator device adds a "broadcast timing advance" to the current clock time of the reference clock used for generating the broadcast timing. In this instance, the reference clock used for generating the broadcast timing is a local clock at the group coordinator. So, if the broadcast timing advance for an individual frame is, for example, 25 milliseconds, then the group coordinator broadcasts the portion (e.g., a sample or set of samples) of audio content in an individual frame (or packet) 25 milliseconds after creating the broadcast timing for that individual frame (or packet).

In this manner, the group coordinator broadcasts audio content by using locally-generated broadcast timing and clock timing from a local reference clock at the group coordinator. By broadcasting the portion(s) of the audio content of an individual frame and/or packet when the clock time of the local reference clock reaches the broadcast timing for that individual frame or packet, the group coordinator broadcasts that portion(s) of the audio content in that individual frame and/or packet in synchrony with other group members in the playback group.

Likewise, if the group coordinator is using clock timing from a local clock at the group coordinator to generate the data output timing, then the group coordinator will output the audio content to a connected audio accessory using locally-generated playback timing and the locally-generated clock timing. In operation, the group coordinator outputs an individual frame (or packet) comprising portions of the audio content to a connected audio accessory when the local clock that the group coordinator used to generate the data output timing reaches the time specified in the data output timing for that individual frame (or packet).

For example, recall that when generating data output timing for an individual frame (or packet), the group coordinator device adds a "data output timing advance" to the current clock time of the reference clock used for generating the data output timing. In this instance, the reference clock used for generating the data output timing is a local clock at the group coordinator. So, if the data output timing advance for an individual frame is, for example, 20 milliseconds, then the group coordinator outputs the portion (e.g., a sample or set of samples) of audio content in an individual frame (or packet) 20 milliseconds after creating the data output timing for that individual frame (or packet).

In this manner, the group coordinator outputs audio content to a connected audio accessory by using locally-generated data output timing and clock timing from a local reference clock at the group coordinator. By outputting the portion(s) of the audio content of an individual frame and/or packet to a connected audio accessory when the clock time of the local reference clock reaches the data output timing for that individual frame or packet, the group coordinator outputs that portion(s) of the audio content in that individual frame and/or packet to the connected audio accessory in synchrony with other group members in the playback group.

m. Playing, Broadcasting, and/or Outputting Audio Content Using Local Playback Timing and Remote Clock Timing As mentioned earlier, in some embodiments, a group coordinator generates playback timing, broadcast timing, and/or data output timing for audio content based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the "remote" clock to generate the playback timing, broadcast timing, and/or data output timing for the audio content, the group coordinator also uses the clock timing from the "remote" clock to correspondingly play, broadcast, and/or output the audio content. In this manner, the group coordinator correspondingly plays, broadcasts, and/or outputs audio content using the locally-generated playback, broadcast, and/or data output timing and the clock timing from the remote clock.

Recall that, in embodiments where the group coordinator generates playback timing for audio content based on clock timing from a remote clock, the group coordinator generates the playback timing for an individual frame (or packet) based on (i) a "clock timing offset" based on a difference between (a) a local clock at the group coordinator and (b) the clock timing from the remote clock, and (ii) a "playback timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio content received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group members, the group coordinator subtracts the "clock timing offset" from the playback timing for that individual frame (or packet) to generate a "local" playback time for playing the audio content within that individual frame (or packet). After generating the "local" playback time for playing the portion(s) of the audio content within the individual frame (or packet), the group coordinator plays the portion(s) of the audio content in the individual frame (or packet) when the local clock that the group coordinator is using to play the audio content reaches the "local" playback time for that individual frame (or packet). By subtracting the "clock timing offset" from the playback timing to generate the "local" playback time for an individual frame, the group coordinator effectively plays the portion(s) of audio content in that frame/packet with reference to the clock timing from the remote clock.

Similarly, in embodiments where the group coordinator generates broadcast timing for audio content based on clock timing from a remote clock, the group coordinator generates the broadcast timing for an individual frame (or packet) based on (i) a "clock timing offset" based on a difference between (a) a local clock at the group coordinator and (b) the clock timing from the remote clock, and (ii) a "broadcast timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio content received from the group coordinator for broadcast. And further recall that, in some embodiments, the group coordinator transmits the generated broadcast timing to all of the group members in the playback group tasked with broadcasting the audio content in synchrony.

In this scenario, to broadcast an individual frame (or packet) of audio content in synchrony with the one or more other group members, the group coordinator subtracts the "clock timing offset" from the broadcast timing for that individual frame (or packet) to generate a "local" broadcast time for broadcasting the audio content within that individual frame (or packet). After generating the "local" broadcast time for broadcasting the portion(s) of the audio content within the individual frame (or packet), the group coordinator broadcasts the portion(s) of the audio content in the individual frame (or packet) when the local clock that the group coordinator is using to broadcast the audio content reaches the "local" broadcast time for that individual frame (or packet). By subtracting the "clock timing offset" from the broadcast timing to generate the "local" broadcast time for an individual frame, the group coordinator effectively broadcasts the portion(s) of audio content in that frame/packet with reference to the clock timing from the remote clock.

Likewise, in embodiments where the group coordinator generates data output timing for audio content based on clock timing from a remote clock, the group coordinator generates the data output timing for an individual frame (or packet) based on (i) a "clock timing offset" based on a difference between (a) a local clock at the group coordinator and (b) the clock timing from the remote clock, and (ii) a "data output timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio content received from the group coordinator for outputting to a connected audio accessory. And further recall that, in some embodiments, the group coordinator transmits the generated data output timing to all of the group members in the playback group tasked with outputting the audio content in synchrony to a connected audio accessory.

In this scenario, to output an individual frame (or packet) of audio content to a connected audio accessory in synchrony with the one or more other group members, the group coordinator subtracts the "clock timing offset" from the data output timing for that individual frame (or packet) to generate a "local" data output time for outputting the audio content within that individual frame (or packet) to the connected audio accessory. After generating the "local" data output time for outputting the portion(s) of the audio content within the individual frame (or packet) to the connected audio accessory, the group coordinator outputs the portion(s) of the audio content in the individual frame (or packet) when the local clock that the group coordinator is using to output the audio content reaches the "local" data output time for that individual frame (or packet). By subtracting the "clock timing offset" from the data output timing to generate the "local" data output time for an individual frame, the group coordinator effectively outputs the portion(s) of audio content in that frame/packet with reference to the clock timing from the remote clock.

n. Playing, Broadcasting, and/or Outputting Audio Content Using Remote Playback Timing and Local Clock Timing Recall that, in some embodiments, the group coordinator transmits the audio content and one or more of the playback timing for the audio content, broadcast timing, and/or data output timing to one or more group members.

If the group member that receives (i.e., the receiving group member) the audio content and playback timing (or broadcast timing or data output timing) from the group coordinator is the same group member that provided clock timing to the group coordinator that the group coordinator used for generating the playback timing (or broadcast timing or data output timing), then the receiving group member in this instance plays (or broadcasts or outputs) audio content using the playback timing (or broadcast timing or data output timing) received from the group coordinator (i.e., remote playback timing, remote broadcast timing, or remote data output timing) and the group member's own clock timing (i.e., local clock timing).

Because the group coordinator used clock timing from a clock at the receiving group member to generate the playback timing (or broadcast timing or data output timing), the receiving group member also uses the clock timing from its local clock to play the audio content (or broadcast or output the audio content). In this manner, the receiving group member plays audio content (or broadcasts or outputs audio content) using the remote playback (or broadcast or data output) timing (i.e., from the group coordinator) and the clock timing from its local clock (i.e., its local clock timing).

To play an individual frame (or packet) of the audio content in synchrony with the group coordinator (and every other playback device that receives the playback timing from the group coordinator and clock timing from the receiving group member), the receiving group member (i) receives the frames (or packets) comprising the portions of the audio content from the group coordinator, (ii) receives the playback timing for the audio content from the group coordinator (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock at the receiving group member reaches the playback time specified in the playback timing for that individual frame (or packet) received from the group coordinator.

Because the group coordinator used the "clock timing offset" (which is the difference between the clock timing at the receiving group member and the clock timing at the group coordinator in this scenario) when generating the playback timing, and because this "clock timing offset" already accounts for differences between timing at the group coordinator and the receiving group member, the receiving group member in this scenario plays individual frames (or packets) comprising portions of the audio content when the receiving group member's local clock (that was used to generate the clock timing) reaches the playback time for an individual frame (or packet) specified in the playback timing for that individual frame (or packet).

And because the receiving group member plays frames (or packets) comprising portions of the audio content according to the playback timing, and because the group coordinator plays the same frames (or packets) comprising portions of the audio content according to the playback timing and the determined "clock timing offset," the receiving group member and the group coordinator play the same frames (or packets) comprising audio content corresponding to the same portions of audio content in synchrony, i.e., at the same time or at substantially the same time.

To broadcast an individual frame (or packet) of the audio content in synchrony with the group coordinator (and every other playback device that receives the broadcast timing from the group coordinator and clock timing from the receiving group member), the receiving group member (i) receives the frames (or packets) comprising the portions of the audio content from the group coordinator, (ii) receives the broadcast timing for the audio content from the group coordinator (e.g., in the frame and/or packet headers of the frames and/or packets comprising the portions of the audio content or perhaps separately from the frames and/or packets comprising the portions of the audio content), and (iii) broadcasts the portion(s) of the audio content in the individual frame (or packet) when the broadcast timing reaches the broadcast time specified in the broadcast timing for that individual frame (or packet) received from the group coordinator.

Because the group coordinator used the "clock timing offset" (which is the difference between the clock timing at the receiving group member and the clock timing at the group coordinator in this scenario) when generating the broadcast timing, and because this "clock timing offset" already accounts for differences between timing at the group coordinator and the receiving group member, the receiving group member in this scenario broadcasts individual frames (or packets) comprising portions of the audio content when the receiving group member's local clock (that was used to generated the clock timing) reaches the broadcast time for an individual frame (or packet) specified in the broadcast timing for that individual frame (or packet).

And because the receiving group member broadcasts frames (or packets) comprising portions of the audio content according to the broadcast timing, and because the group coordinator broadcasts the same frames (or packets) comprising portions of the audio content according to the broadcast timing and the determined "clock timing offset," the receiving group member and the group coordinator broadcast the same frames (or packets) comprising audio content corresponding to the same portions of audio content in synchrony, i.e., at the same time or at substantially the same time.

To output an individual frame (or packet) of the audio content to a connected audio accessory in synchrony with the group coordinator (and every other playback device that receives the data output timing from the group coordinator and clock timing from the receiving group member), the receiving group member (i) receives the frames (or packets) comprising the portions of the audio content from the group coordinator, (ii) receives the data output timing for the audio content from the group coordinator (e.g., in the frame and/or packet headers of the frames and/or packets comprising the portions of the audio content or perhaps separately from the frames and/or packets comprising the portions of the audio content), and (iii) outputs the portion(s) of the audio content in the individual frame (or packet) to a connected audio accessory when the data output timing reaches the data output time specified in the data output timing for that individual frame (or packet) received from the group coordinator.

Because the group coordinator used the "clock timing offset" (which is the difference between the clock timing at the receiving group member and the clock timing at the group coordinator in this scenario) when generating the data output timing, and because this "clock timing offset" already accounts for differences between timing at the group coordinator and the receiving group member, the receiving group member in this scenario outputs individual frames (or packets) comprising portions of the audio content to a connected audio accessory when the receiving group member's local clock (that was used to generated the clock timing) reaches the data output time for an individual frame (or packet) specified in the data output timing for that individual frame (or packet).

And because the receiving group member outputs frames (or packets) comprising portions of the audio content according to the data output timing, and because the group coordinator outputs the same frames (or packets) comprising portions of the audio content according to the data output timing and the determined "clock timing offset," the receiving group member and the group coordinator output the same frames (or packets) comprising audio content corresponding to the same portions of audio content to their respective connected audio accessories in synchrony, i.e., at the same time or at substantially the same time.

o. Playing, Broadcasting, and/or Outputting Audio Content Using Remote Playback Timing and Remote Clock Timing Recall that, in some embodiments, the sourcing playback device (e.g., which in many cases may be the group coordinator) transmits the audio content and the playback timing (or broadcast timing or data output timing) for the audio content to one or more other playback devices in the playback group. And further recall that, in some embodiments, the network device providing the clock timing can be a different device than the playback device providing the audio content and playback (or broadcast or data output) timing (i.e., the sourcing playback device, which in many cases may be the group coordinator). Playback devices that receive the audio content, the playback timing (or broadcast or data output timing), and the clock timing from one or more other devices are configured to play (or broadcast or output) the audio content using the playback timing (or broadcast or data output timing) from the device that provided the playback (or broadcast or data output) timing (i.e., remote playback timing) and clock timing from a clock at the device that provided the clock timing (i.e., remote clock timing). In this manner, the receiving group member in this instance plays (or broadcasts or outputs) audio content by using remote playback (or broadcast or data output) timing and remote clock timing.

To play an individual frame (or packet) of the audio content in synchrony with every other playback device tasked with playing audio content in the playback group, the receiving playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the clock timing, and (iv) plays the portion(s) of the audio content in the individual frame (or packet) when the local clock that the receiving playback device uses for audio content playback reaches the playback time specified in the playback timing for that individual frame (or packet), as adjusted by a "clock timing offset."

Similarly, to broadcast an individual frame (or packet) of the audio content in synchrony with every other playback device tasked with broadcasting audio content in the playback group, the receiving playback device (i) receives the frames (or packets) comprising the portions of the audio content, (ii) receives the broadcast timing for the audio content (e.g., in the frame and/or packet headers of the frames and/or packets comprising the portions of the audio content or perhaps separately from the frames and/or packets comprising the portions of the audio content), (iii) receives the clock timing, and (iv) broadcasts the portion(s) of the audio content in the individual frame (or packet) when the local clock that the receiving playback device uses for audio content broadcasting reaches the broadcast time specified in the broadcast timing for that individual frame (or packet), as adjusted by a "clock timing offset."

Likewise, to output an individual frame (or packet) of the audio content to a connected audio accessory in synchrony with every other playback device in the playback group tasked with outputting audio content to a connected audio accessory, the receiving playback device (i) receives the frames (or packets) comprising the portions of the audio content, (ii) receives the data output timing for the audio content (e.g., in the frame and/or packet headers of the frames and/or packets comprising the portions of the audio content or perhaps separately from the frames and/or packets comprising the portions of the audio content), (iii) receives the clock timing, and (iv) outputs the portion(s) of the audio content in the individual frame (or packet) to the connected audio accessory when the local clock that the receiving playback device uses for outputting audio content to the connected audio accessory reaches the data output time specified in the data output timing for that individual frame (or packet), as adjusted by a "clock timing offset."

In some embodiments, when playing/broadcasting/outputting the audio content, the receiving playback device generates new playback/broadcast/output timing (specific to the receiving playback device) for individual frames (or packets) of audio content by adding the previously determined "clock timing offset" to the playback/broadcast/output timing for each received frame (or packet) comprising portions of audio content. With this approach, the receiving playback device converts the playback/broadcast/output timing for the received audio content into "local" playback/broadcast/output timing for the receiving playback device.

Because each receiving playback device calculates its own "clock timing offset," each receiving playback device's determined "local" playback/broadcast/output timing for an individual frame of audio content is specific to that particular playback device. In operation, after the receiving playback device receives clock timing, the receiving playback device determines a "clock timing offset" for the receiving playback device. This "clock timing offset" comprises (or at least corresponds to) a difference between the "reference" clock that was used to generate the clock timing and a "local" clock at the receiving playback device that the receiving playback device uses to play/broadcast/output the audio content. In operation, each playback device that receives the clock timing from another device calculates its own "clock timing offset" based on the difference between its local clock and the clock timing, and thus, the "clock timing offset" that each playback device determines is specific to that particular playback device.

And when the "local" clock that the receiving playback device is using for playing/broadcasting/outputting the audio content reaches the "local" playback/broadcast/output time for an individual frame (or packet), the receiving playback device plays/broadcasts/outputs the audio content (or portions thereof) associated with that individual frame (or packet). As described above, in some embodiments, the playback/broadcast/output timing for a particular frame (or packet) is in the header of the frame (or packet). In other embodiments, the playback/broadcast/output timing for individual frames (or packets) is transmitted separately from the frames (or packets) comprising the audio content. In some embodiments, the broadcasting timing is or comprises a broadcast timing offset relative to the playback timing. And in some embodiments, the data output timing is or comprises a data output timing offset relative to the playback timing.

Because the receiving playback device plays/broadcasts/outputs frames (or packets) comprising portions of the audio content according to the playback/broadcast/output timing as adjusted by the "clock timing offset" relative to the clock timing, and because the device providing the playback/broadcast/output timing generated the playback/broadcast/ output timing for those frames (or packets) relative to the clock timing and (if applicable) plays/broadcasts/outputs the same frames (or packets) comprising portions of the audio content according to the playback/broadcast/output timing and its determined "clock timing offset," the receiving playback device and the device that provided the playback/broadcast/output timing (e.g., the group coordinator in some embodiments) play/broadcast/output the same frames (or packets) comprising the same portions of the audio content in synchrony with each other, i.e., at the same time or at substantially the same time.

VI. Example Playback Systems and Playback Devices

The example embodiments described herein illustrate (i) playback devices configured to, among other features, broadcast audio content to wearable devices, and (ii) wearable devices configured to, among other features, (a) play audio content broadcasted by playback devices in synchrony (or at least substantially in synchrony with) playback devices and other wearable devices and (b) transition between receiving broadcasted audio content from a first playback device to receiving broadcasted audio content from a second playback device. Example embodiments described herein also illustrate (i) playback devices configured to, among other features, output audio content to connected audio accessories, and (ii) audio accessories configured to, among other features, play audio content received from a playback device in synchrony (or at least substantially in synchrony with) with one or more playback devices, or alternatively cause an audio device connected to the audio accessory to play audio content received from a playback device in synchrony (or at least substantially in synchrony with) with one or more playback devices.

Figure 7:
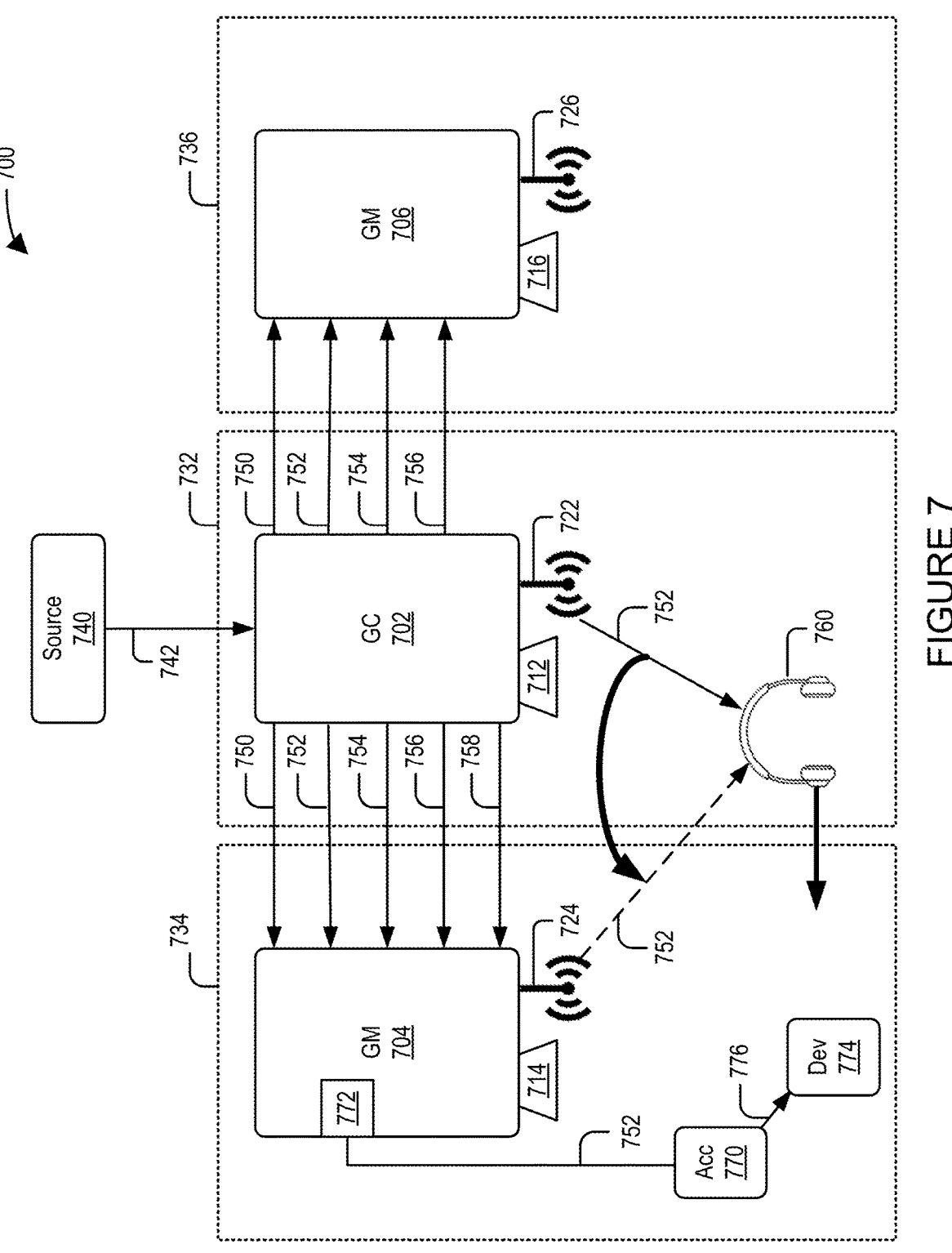
FIG. 7 shows an example configuration of a media playback system comprising playback devices, a wearable device, and an audio accessory according to some embodiments.

FIG. 7 shows an example configuration of a media playback system 700 comprising playback devices 702, 704, and 706, a wearable device 760, and an audio accessory 770.

The playback devices 702, 704, and 706 are the same as or similar to any of the playback devices disclosed and described herein. For example, each playback device (e.g., playback devices 702, 704, and 706) includes one or more processors and tangible, non-transitory computer-readable memory configured to store program instructions, where the program instructions, when executed, cause the playback device to perform the playback device functions disclosed and described herein.

Likewise, each wearable (e.g., wearable 760) also includes one or more processors and tangible, non-transitory computer-readable memory configured to store program instructions, where the program instructions, when executed, cause the wearable to perform the wearable functions disclosed and described herein. Similarly, each audio accessory (e.g., audio accessory 770) also includes one or more processors and tangible, non-transitory computer-readable memory configured to store program instructions, where the program instructions, when executed, cause the audio accessory to perform the audio accessory functions disclosed and described herein Each playback device in media playback system 700 also includes one or more speakers, a wireless local area network (WLAN) interface, a personal area network (PAN) interface, and a data output interface. In operation, each playback device is configurable to (i) transmit and/or receive clock timing 750, audio content 752, playback timing 754, broadcast timing 756, and/or data output timing 758 via its WLAN interface, (ii) play audio content 752 via its one or more speakers (e.g., 712, 714, and 716), (iii) broadcast audio content 752 via its PAN interface (e.g., 722, 724, and 726), and/or (iv) output audio content 752 to an audio accessory via its data output interface (e.g., 772).

In some embodiments, the WLAN interface comprises a WiFi interface. However, in other embodiments, the WLAN interface may comprise any other type of wireless local area network interface now known or later developed that is suitable for transmitting/receiving media (including audio data) and related control data to/from playback devices via a wireless network. In some embodiments, the PAN interface comprises a Bluetooth interface, e.g., a Bluetooth Classic or Bluetooth Low Energy interface. However, in other embodiments, the PAN interface may comprise any other type of personal area network interface now known or later developed that is suitable for broadcasting media (including audio data) from a playback device to one or more wearable devices via wireless transmission.

For example, playback device 702 includes one or more speakers 712, a WLAN interface (not shown), PAN interface 722, and a data output interface (not shown). Similarly, playback device 704 includes one or more speakers 714, a WLAN interface (not shown), PAN interface 724, and a data output interface 774. And playback device 706 includes one or more speakers 716, a WLAN interface (not shown), a PAN interface 726, and a data output interface (not shown).

In media playback system 700, playback device 702, playback device 704, and playback device 706 are members of a playback group, where playback device 702 is configured as a group coordinator and playback devices 704 and 706 are configured as group members.

Playback devices 702, 704, and 706 are configured to play audio content 752 together in a groupwise fashion, including playing audio content 752 in synchrony (or at least substantially in synchrony) with each other. For example, in some embodiments, playback devices 702, 704, and 706 are configured in a synchrony group, where each playback device plays the same audio content in synchrony together. As another example, in some embodiments, playback devices 702, 704, and 706 are configured in a bonded group format arranged to play home theater audio content, where the individual playback devices are configured to play different channels (e.g., home theater channels) of the same audio content in a groupwise fashion. In yet another example, in some embodiments, (i) playback devices 702 and 704 are configured in a stereo pair arrangement, where playback device 702 plays a first stereo channel of audio content in a groupwise fashion with the playback device 704, which plays a second stereo channel of audio content, and (ii) playback device 706 and the stereo pair of playback devices 702 and 704 are configured in a synchrony group where playback device 706 and the stereo pair (of playback devices 702 and 704) are configured to play audio content in synchrony with each other. Other playback groupings and configurations are possible as well.

As the group coordinator of the media playback system 700, playback device 702 is configured to receive and process audio content 742 from audio source 740, and distribute the processed audio content 752 to the group member playback devices 704 and 706.

In operation, playback device 702 (operating as the group coordinator) provides clock timing information 750 to playback devices 704 and 706 via a WLAN interface. And playback devices 704 and 706 (operating as group members) receive the clock timing information 750 from playback device 702 (operating as the group coordinator). The playback device 702 uses the clock timing 750 to generate playback timing 754, broadcast timing 756, and data output timing 758.

In some embodiments, the playback timing 754, broadcast timing 756, and data output timing 758 are the same as or similar to any of the playback timing, broadcast timing, and data output timing disclosed and described herein. In operation, the playback device 702 generates the playback timing 754, broadcast timing 756, and/or data output timing 758 according to any of the methods disclosed and described herein.

For example, in some embodiments, playback device 702 transmits a series of frames (or packets) to playback devices 704 and 706, where the series of frames (or packets) comprises one or more of (i) portions of the audio content 752, (ii) playback timing 754 for individual portions of the audio content 752, (iii) broadcast timing 756 for individual portions of the audio content 752, and/or (iv) data output timing 758 for individual portions of the audio content 752. As explained earlier, the broadcast timing 756 and/or the data output timing 758 may include an offset relative to the playback timing 754 such that playback devices 704 and 706 can generate their own broadcast timing and/or data output timing based on their playback timing, perhaps after initially receiving broadcast timing and/or data output timing from playback device 702 in the form of a broadcast timing offset and/or data output timing offset.

As mentioned above, playback device 702, playback device 704, and playback device 706 are in a playback group and configured to play audio content 750 in a groupwise fashion. In operation, playback device 702 plays audio content 752 via one or more speakers 712, playback device 704 plays audio content 752 via one or more speakers 714, and playback device plays audio content 752 via one or more speakers 716. Playback devices 702, 704, and 706 play audio content 752 based on the clock timing 750 and playback timing 754 according to any of the playback methods disclosed and described herein.

In the example shown in FIG. 7, playback device 702, playback device 704, and playback device 706 are also configured to broadcast audio content 752 to wearable device 760 (or "wearable 760"). Wearable 760 is shown as a set of headphones. However, wearable 760 could alternatively be a smartwatch, networked glasses (or smart glasses), a hearing aid, or other portable device suitable for performing the wearable functions disclosed and described herein.

In operation, playback device 702 generates broadcast timing 756 according to any of the broadcast timing generation methods disclosed and described herein. Playback device 702 also transmits the broadcast timing 756 via its WLAN interface to playback device 704 and playback device 706. In operation, playback devices 702, 704 and 706 each broadcast the audio content 752 via their respective PAN interfaces 722, 724, and 726.

For example, playback device 702 broadcasts audio content 752 via PAN interface 722 based on the clock timing information 750 and the broadcast timing 756. In operation, a wearable within the wireless area 732 of PAN interface 722 can receive audio content 752 broadcasted by playback device 702 via PAN interface 722.

Similarly, playback device 704 broadcasts audio content 752 via PAN interface 724 based on the clock timing information 750 and the broadcast timing 756. In operation, a wearable within the wireless area 734 of PAN interface 724 can receive audio content 752 broadcasted by playback device 704 via PAN interface 724.

Likewise, playback device 706 broadcasts audio content 752 via PAN interface 726 based on the clock timing information 750 and the broadcast timing 756. In operation, a wearable within the wireless area 736 of PAN interface 726 can receive audio content 752 broadcasted by playback device 706 via PAN interface 726.

While wearable 760 is within the wireless area 732 of playback device 702, wearable 760 receives audio content 752 broadcasted by playback device 702 via PAN interface 722. But as shown in FIG. 7, when wearable 760 moves from wireless area 732 to wireless area 734, wearable 760 switches from receiving the audio content 752 from playback device 702 via PAN interface 722 to instead receive the audio content 752 from playback device 704 via PAN interface 724.

In situations where wireless area 732 overlaps with wireless area 734, wearable 760 may receive audio content 752 from both playback device 702 and playback device 704, but select transmissions from one of playback device 702 or playback device 704 for playback based on which of the broadcasts has the better wireless quality (e.g., based on one or more of signal strength, noise, signal-to-noise ratio, or any other wireless signal quality metric now known or later developed that is suitable for use in assessing and comparing the quality of two or more wireless broadcast signals).

For example, in the scenario shown in FIG. 7, wearable 760 is initially subscribed to a first stream comprising audio content 752 broadcasted from playback device 702 while the wearable 760 is within wireless area 732. But when the wearable 760 moves out of wireless area 732 and into wireless 734, wearable 760 unsubscribes from the first stream and subscribes to a second stream comprising audio content 752 broadcasted from playback device 704. Because playback device 702 and playback device 704 are both using the clock timing 750 and broadcast timing 756 to broadcast the audio content 752 in synchrony with each other, the wearable 760's transition from receiving the first stream comprising the audio content 752 via playback device 702 to receiving the second stream comprising the audio content 752 via playback device 704 happens seamlessly or at least substantially seamlessly, at least from the standpoint of the wearer of the wearable 760.

In some embodiments, the wearable 160 determines when to cut-over from the first stream to the second stream based on, e.g., when one or more wireless signal quality metrics associated with transmissions from PAN interface 724 are a threshold amount better than the one or more wireless signal quality metrics associated with transmissions from PAN interface 722.

In some embodiments, the wearable 760 may buffer a few frames of audio content 752 before playback to facilitate a smooth cut-over. Buffering a few frames (e.g., 10-20 milliseconds of audio content 760) enables the wearable 760 to play those few frames while effectuating the transition from receiving the audio content 752 from playback device 702 to receiving the audio content 752 from playback device 704, thereby allowing the wearable 760 to effectuate the cut-over without any disruption in playback of the audio content 752, or at least with only a very minor disruption in playback of the audio content 752. In some embodiments, the wearable 760 may additionally or alternatively play a tone, announcement, or other indication of the changeover to both (i) notify or otherwise inform the wearer of the wearable 760 of the changeover and (ii) to obscure or perhaps fill any momentary pause in the playback of the audio content 752 during the changeover.

In some embodiments, the playback devices 702, 704, and 706 are configured to play the audio content 752 via their speakers in synchrony with each other while also broadcasting the audio content 752 via their PAN interfaces in synchrony with each other. This arrangement may be advantageous in scenarios where a hearing impaired person is watching television with friends or family members. The family members will want to hear the audio content from the television program out-loud, but the hearing impaired person may prefer the audio content played back via the wearable 160 in order to better hear and/or understand the audio content.

In this scenario, the playback device 702 may incorporate an offset (e.g., a delay or an advance) between the playback timing 754 (used by the playback devices 702, 704, and 706 to play the audio content 752 via speakers) and the broadcast timing 756 (used by the playback devices 702, 704, and 706 to broadcast the audio content 752 via the PAN interfaces) so as to cause the wearer of the wearable 760 to hear the audio content 752 emitted by the wearable 760 at about the same time as the audio content 752 emitted by the speakers of the playback devices 702, 704, and 706.

In some instances, the offset between the playback timing 754 and the broadcast timing 756 may be fixed to account for a static time-of-flight delay between an assumed distance between the wearable 760 and a playback device, e.g., about 10-15 feet. In some embodiments, the assumed distance may be based on a typical distance between a soundbar located under or near a television and a where a viewer would typically watch the television.

In some embodiments, the offset can be determined dynamically based on a measured distance between the wearable 760 and at least one of the playback devices. The distance between the wearable 760 and a playback device can be calculated in one of several ways. For example, the wearable 760 could estimate its distance from the playback device via which it is receiving the audio content 752 based on the Received Signal Strength Indicator (RSSI) of the transmission signal emitted from the playback device's PAN interface and report the estimated distance to the playback device. In another example, a playback device can emit an ultrasonic tone, and the wearable 760 can inform the playback device when it detected the ultrasonic tone. The playback device can then compare the transmission time of the ultrasonic tone by the playback device and detection time of the ultrasonic tone at the wearable 760 to estimate the distance between the playback device and the wearable 760. In some embodiments, the offset may be based on an average of distances between the wearable 760 and each of the playback devices in the playback group.

In the example shown in FIG. 7, playback device 704 is also configured to output audio content 752 to audio accessory 770 via data output interface 772.

In some embodiments, the audio accessory 770 comprises a hub or similar device configured to (i) receive the audio content 752 from playback device 704, and (ii) transmit the audio content 752 to an audio device 774 in communication with the audio accessory 770. In some embodiments, the audio device 774 is a wearable device such as a hearing aid or headphones.

In some embodiments, the audio accessory 770 may be advantageous (or even required) in scenarios where the audio device 774 uses an audio content format different than the audio content format used by the playback devices 702, 704, and 706 and/or the audio content format used by the wearable 760.

In the example shown in FIG. 7, the audio accessory 770 is connected to the data output interface 772 of playback device 772 via a cable, wireless link, or other suitable communications connection. In some embodiments the data output interface 772 comprises a Universal Serial Bus (USB) interface. However, in other embodiments, the data output interface 772 may comprise other types of interfaces now known or later developed that are suitable for transmission of audio content.

The audio accessory 770 is configured to transmit audio content 776 to the audio device 774. In this example, the audio content 776 that the audio accessory 770 transmits to the audio device 774 is a different format than the audio content 752 that the playback device 704 transmits to the audio accessory 770. However, audio content 752 and audio content 776 may instead be the same format in some instances.

In the example shown in FIG. 7, the playback device 704 transmits the audio content 752 to the audio accessory 770 based on the clock timing 750 and data output timing 758 received from playback device 702. In some embodiments the data output timing 758 is based on the playback timing 754, as described previously.

In some embodiments, the playback devices 702, 704, and 706 are configured to play the audio content 752 via their speakers in synchrony with each other while playback device 704 transmits the audio content 752 to the audio accessory 770, which in turn transmits audio content 776 to the audio device 774. This arrangement may be advantageous in scenarios where a hearing impaired person is watching television with friends or family members. The family members may want to hear the audio content from the television program out-loud, but the hearing impaired person may prefer the audio content played back via the audio device 774 in order to better hear and/or understand the audio content.

In this scenario, the playback device 702 may incorporate an offset (e.g., a delay or an advance) between the playback timing 754 (used by the playback devices 702, 704, and 706 to play the audio content 752 via speakers) and the data output timing 758 (used by the playback device 704 to output the audio content 752 via the data output interface 772 to the audio accessory 770) so as to cause the wearer of the audio device 774 to hear the audio content 776 emitted by the audio device 774 at about the same time as the audio content 752 emitted by the speakers of the playback devices 702, 704, and 706.

In some instances, the offset between the playback timing 754 and the data output timing 758 may be fixed or adjustable to account for the time required for the audio accessory 770 to receive and process audio content 752 from the playback device 704 and then transmit the audio content 776 to the audio device 774, so that the audio device 774 and the playback devices 702, 704, and 706 play the same audio content at the same time, or at least substantially the same time.

VII. Example Methods

FIG. 8 shows an example method 800 performed by a playback device according to some embodiments. For example, method 800 may be performed by a playback devices such as playback device 702 in FIG. 7.

Method 800 begins at block 802, which includes a first playback device obtaining audio content from an audio content source via a Wireless Local Area Network (WLAN) according to a first communications protocol.

Next, method 800 advances to block 804, which includes the first playback device generating playback times for individual portions of the audio content. In some embodiments, the playback time for an individual portion of the audio content is indicative of a future time relative to a clock at the first playback device.

Next, method 800 advances to one or more of four branches depending on whether the first playback device is configured to (i) broadcast audio content in a groupwise fashion with one or more other playback devices, (ii) play the audio content in a groupwise fashion with one or more other playback devices, (iii) distribute audio content to one or more other playback devices for playback in a groupwise fashion, and/or (iv) output audio content to an audio accessory or control the output of audio content from one or more other playback devices to one or more connected audio accessories. In some embodiments, a playback device may perform the functions in one or more (or all) of the four branches in parallel or at least substantially in parallel.

If the first playback device is configured to broadcast audio content in a groupwise fashion with one or more other playback devices, then method 800 advances to the first branch, which includes blocks 806, 808, and 810.

The first branch of method 800 includes block 806, which includes the first playback device generating broadcast times for the individual portions of the audio content based on the playback times for the individual portions of the audio content, where the broadcast time for an individual portion of the audio content is based on the playback time for that individual portion of the audio content. In some embodiments, the broadcast time for an individual portion of the audio content is earlier than the playback time for that individual portion of audio content. In other embodiments, the broadcast time for an individual portion of the audio content is later than the playback time for that individual portion of audio content.

In some embodiments, the first playback device generating broadcast times for the individual portions of the audio content based on the playback times for the individual portions of the audio content at block 806 includes the first playback device generating broadcast times for the individual portions of the audio content based on the playback times for the individual portions of the audio content after detecting that a wearable device is within broadcast range of a Personal Area Network (PAN) operated by the playback device.

In some embodiments, the broadcast time for an individual portion of the audio content is based on a distance between the first playback device and the wearable device that is within broadcast range of the PAN.

To determine the distance between the first playback device and the wearable device, some embodiments include the first playback device (i) emitting an ultrasonic tone via the one or more speaker drivers, and (ii) after receiving an indication of when the wearable device detected the ultrasonic tone, determining the distance between the first playback device and the wearable device based on when the wearable device detected the ultrasonic tone. Some embodiments additionally or alternatively include the first playback device determining the distance between the first playback device and the wearable device based on Received Signal Strength Indicator (RSSI) data received from the wearable device.

Next, the first branch of method 800 advances to block 808, which includes the first playback device transmitting the individual portions of the audio content and the broadcast times for the individual portions of the audio content to at least a second playback device via the WLAN according to the first communications protocol.

Next, the first branch of method 800 advances to block 810, which includes, the first playback device, based on a current clock time of the clock at the first playback device and the broadcast time for an individual portion of the audio content, broadcasting that portion of the audio content to the PAN according to a second communications protocol that is different than the first communications protocol. In some embodiments, the first communications protocol comprises a WiFi protocol and the second communications protocol comprises a Bluetooth protocol.

If the first playback device is additionally or alternatively configured to play the audio content in a groupwise fashion with one or more other playback devices, then method 800 advances to the second branch, which includes block 812.

Block 812 includes the first playback device, based on the current clock time of the clock at the first playback device and the playback time for an individual portion of the audio content, playing that individual portion of the audio content via the one or more speaker drivers.

If the first playback device is additionally or alternatively configured to distribute audio content to one or more other playback device for playback in a groupwise fashion, then method 800 advances to the third branch, which includes block 814.

Block 814 includes the first playback device transmitting the individual portions of the audio content and the playback times for the individual portions of the audio content to at least a second playback device via the WLAN according to the first communications protocol.

If the first playback device is additionally or alternatively configured to output audio content to an audio accessory or control the output of audio content from one or more other playback devices to one or more connected audio accessories, then method 800 advances to the fourth branch, which includes block 816 and 818.

The fourth branch of method 800 begins at block 816, which includes the first playback device generating data output times for the individual portions of the audio content based on the playback times for the individual portions of the audio content. In some embodiments, the data output time for an individual portion of the audio content is based on the playback time for that individual portion of the audio content.

Next, the fourth branch of method 800 advances to block 818, which includes the first playback device, based on the current clock time of the clock at the first playback device and the data output time for an individual portion of the audio content, transmitting that portion of the audio content via the wired communication interface according to a third communications protocol that is different than the first and second communications protocols.

FIG. 9 shows an example method 900 performed by a wearable device according to some embodiments. In some embodiments, the wearable device comprises one of (i) a headphone device or (ii) a hearing aid. For example, method 900 may be performed by a wearable device such as wearable 760 shown in FIG. 7.

Method 900 begins at block 902, which includes a wearable device, playing, via one or more speaker drivers of the wearable, audio content received via a first Personal Area Network (PAN) from a first playback device (e.g., playback device 702 in FIG. 7). In embodiments where individual portions of the audio content have corresponding sequence identifiers, the wearable playing the audio content received via the first PAN from the first playback device at block 902 includes arranging the individual portions of the audio content received via the first PAN from the first playback device according to the corresponding sequence identifiers. In some embodiments, the PAN comprises a Bluetooth PAN.

Next, method 900 advances to block 904, which includes while the wearable device is playing the audio content received via the first PAN from the first playback device, the wearable device determining whether the wearable device should switch to receiving the audio content via a second PAN from a second playback device (e.g., playback device 704 in FIG. 7).

In some embodiments, the wearable device determining whether it should switch to receiving the audio content via the second PAN from the second playback device at block 904 includes the wearable device (i) determining a first Received Signal Strength Indicator (RSSI) for broadcasts received from the first playback device, (ii) determining a second RSSI for broadcasts received from the second playback device, and (iii) determining that the wearable device should switch to receiving the audio content via the second PAN from the second playback device when the second RSSI is greater than the first RSSI by a configured margin.

In some embodiments, the wearable device determining whether it should switch to receiving the audio content via the second PAN from the second playback device at block 904 additionally or alternatively includes the wearable device (i) determining a first time difference between when the first playback device emitted a first ultrasonic tone and when the wearable device detected the first ultrasonic tone via one or more microphones of the wearable device, (ii) determining a second time difference between when the second playback device emitted a second ultrasonic tone and when the wearable device detected the second ultrasonic tone via the one or more microphones, and (iii) determining that the wearable device should switch to receiving the audio content via the second PAN from the second playback device when the second time difference is smaller than the first time difference by a configured margin, thereby indicating that the wearable device is physically closer to the second playback device than the first playback device.

In some embodiments, the wearable device determining whether it should switch to receiving the audio content via the second PAN from the second playback device at block 904 additionally or alternatively includes the wearable device determining whether it should switch to receiving the audio content via the second PAN from the second playback device on one of a periodic or semi-periodic basis.

Next, method 900 advances to block 906, which includes the wearable device, after determining that it should switch to receiving the audio content via the second PAN from the second playback device, the wearable device (i) switching to receiving the audio content via the second PAN from the second playback device and (ii) playing, via the one or more speaker drivers, the audio content received via the second PAN from the second playback device.

In some embodiments, switching to receiving the audio content via the second PAN from the second playback device at block 906 includes the wearable device playing a stream change indication via the one or more speaker drivers of the wearable device, where the stream change indication indicates that the wearable device is switching from receiving the audio content from the first playback device via the first PAN to receiving the audio content from the second playback device via the second PAN.

In embodiments where individual portions of the audio content have corresponding sequence identifiers, the wearable device playing audio content received via the second PAN from the second playback device at block 906 includes the wearable device arranging the individual portions of the audio content received via the second PAN from the second playback device according to the corresponding sequence identifiers. In some embodiments, the wearable device arranging the individual portions of the audio content received via the second PAN from the second playback device according to the corresponding sequence identifiers includes the wearable device discarding any duplicate individual portion of the audio content when the wearable device has received two individual portions of the audio content having the same sequence identifier.

FIG. 10 shows an example method 1000 performed by a playback device according to some embodiments. In example method 1000, the playback device functions are performed by a first playback device that is configured in a playback group with at least a second playback device, e.g., the second playback device of method 1100 (FIG. 11).

Method 1000 begins at block 1002, which includes a first playback device transmitting clock timing information to the second playback device, wherein the clock timing information is associated with a first clock at the first playback device.

Next, method 1000 advances to block 1004, which includes the first playback device obtaining audio content from an audio content source via a WLAN according to a first communications protocol.

Next, method 1000 advances to block 1006, which includes the first playback device generating playback times for individual portions of the audio content, wherein the playback time for an individual portion of the audio content is indicative of a future time relative the first clock at the first playback device.

Next, method 1000 advances to block 1008, which includes the first playback device transmitting a series of frames to the second playback device via the WLAN according to the first communications protocol, wherein the series of frames comprises the individual portions of the audio content, and the playback times for the individual portions of the audio content.

Next, method 1000 advances to block 1010, which includes the first playback device, based on a current clock time of the first clock at the first playback device and the playback time for an individual portion of the audio content, broadcasting, via a second communications protocol that is different than the first communications protocol, that portion of the audio content to a first PAN in synchrony with the second playback device broadcasting that portion of the audio content to a second PAN.

FIG. 11 shows an example method 1100 performed by a playback device according to some embodiments. In example method 1100, the playback device functions are performed by a second playback device that is configured in a playback group with at least a first playback device, e.g., the first playback device of method 1000 (FIG. 10).

Method 1100 begins at block 1102, which includes the second playback device receiving the clock timing information and the series of frames from the first playback device via a WLAN, wherein the series of frames comprises the individual portions of the audio content, and the playback times for the individual portions of the audio content.

Next, method 1100 advances to block 1104, which includes the second playback device generating updated playback times for the individual portions of the audio content based on a difference between the first clock at the first playback device and a second clock at the second playback device, wherein the difference is based on the clock timing information.

Next, method 1100 advances to block 1106, which includes the second playback device, based on a current clock time of the second clock at the second playback device and the updated playback time for an individual portion of the audio content, broadcasting, via the second communications protocol that is different than the first communications protocol, that portion of the audio content to the second PAN in synchrony with the first playback device broadcasting that portion of the audio content to the first PAN.

VIII. Example Configurations

Additional examples of playback devices that can offer the functionality provided by sophisticated playback devices without compromising on size and/or battery life are described below.

A first example of a first playback device comprises (i) one or more processors; (ii) one or more speaker drivers; (iii) one or more communication interfaces configured to communicate via a Personal Area Network (PAN) and a Wireless Local Area Network (WLAN); (iv) a tangible, non-transitory computer-readable memory; and (v) program instructions stored on the tangible, non-transitory computer-readable memory. The program instructions, when executed by the one or more processors, configure the first playback device to (i) obtain audio content from an audio content source via the WLAN according to a first communications protocol; (ii) generate playback times for individual portions of the audio content, where the playback time for an individual portion of the audio content is indicative of a future time relative a clock at the first playback device; (iii) generate broadcast times for the individual portions of the audio content based on the playback times for the individual portions of the audio content, where the broadcast time for an individual portion of the audio content is based on the playback time for that individual portion of the audio content; and (iv) based on a current clock time of the clock at the first playback device and the broadcast time for an individual portion of the audio content, broadcast that portion of the audio content to a PAN according to a second communications protocol that is different than the first communications protocol.

A second example of a first playback device that includes all of the features of the first example comprises program instructions that, when executed by the one or more processors, configure the first playback device to, based on the current clock time of the clock at the first playback device and the playback time for an individual portion of the audio content, play that individual portion of the audio content via the one or more speaker drivers.

In a third example of a first playback device that includes any combination of the features of the preceding examples, the broadcast time for an individual portion of the audio content is earlier than the playback time for that individual portion of audio content.

A fourth example of a first playback device that includes any combination of the features of the preceding examples comprises program instructions that, when executed by the one or more processors, configure the first playback device to transmit the individual portions of the audio content and the playback times for the individual portions of the audio content to at least a second playback device via the WLAN according to the first communications protocol.

A fifth example of a first playback device that includes any combination of the features of the preceding examples comprises program instructions that, when executed by the one or more processors, configure the first playback device to transmit the individual portions of the audio content and the broadcast times for the individual portions of the audio content to at least a second playback device via the WLAN according to the first communications protocol.

In a sixth example of a first playback device that includes any combination of the features of the preceding examples, the first playback device further comprises a wired communication interface, and the program instructions comprise program instructions that, when executed by the one or more processors, configure the first playback device to (i) generate data output times for the individual portions of the audio content based on the playback times for the individual portions of the audio content, where the data output time for an individual portion of the audio content is based on the playback time for that individual portion of the audio content; and (ii) based on the current clock time of the clock at the first playback device and the data output time for an individual portion of the audio content, transmit that portion of the audio content via the wired communication interface according to a third communications protocol that is different than the first and second communications protocols.

In a seventh example of a first playback device that includes any combination of the features of the preceding examples, the program instructions that, when executed by the one or more processors, configure the first playback device to generate broadcast times for the individual portions of the audio content based on the playback times for the individual portions of the audio content comprise program instructions that, when executed by the one or more processors, configure the first playback device to generate broadcast times for the individual portions of the audio content based on the playback times for the individual portions of the audio content after detecting that a wearable device is within broadcast range of the PAN.

In an eighth example of a first playback device that includes all of the features of the seventh example, the broadcast time for an individual portion of the audio content is based on a distance between the first playback device and the wearable device that is within broadcast range of the PAN.

In a ninth example of a first playback device that includes all of the features of the eighth example, the program instructions, when executed by the one or more processors, configure the first playback device to (i) emit an ultrasonic tone via the one or more speaker drivers; and (ii) after receiving an indication of when the wearable device detected the ultrasonic tone, determine the distance between the first playback device and the wearable device based on when the wearable device detected the ultrasonic tone.

In a tenth example of a first playback device that includes all of the features of the eighth example, the program instructions, when executed by the one or more processors, configure the first playback device to determine the distance between the first playback device and the wearable device based on Received Signal Strength Indicator (RSSI) data received from the wearable device.

In an eleventh example of a first playback device that includes any combination of the features of the first through seventh examples, the first communications protocol comprises a WiFi protocol and the second communications protocol comprises a Bluetooth protocol.

A first example of a wearable device comprises (i) one or more processors; (ii) one or more speaker drivers; (iii) a communication interface configured to communicate via a Personal Area Network (PAN) communications protocol; (iv) a tangible, non-transitory computer-readable memory; (v) a housing configured to be worn by a user, where the housing carries the one or more processor, the one or more speaker drivers, the communication interface, and the tangible, non-transitory computer-readable memory; and (vi) program instructions stored on the tangible, non-transitory computer-readable memory. The program instructions, when executed by the one or more processors, configure the wearable device to (i) via the one or more speaker drivers, play audio content received via a first PAN from a first playback device; (ii) while playing the audio content received via the first PAN from the first playback device, determine whether the wearable device should switch to receiving the audio content via a second PAN from a second playback device; and (iii) after determining that the wearable device should switch to receiving the audio content via the second PAN from the second playback device, switch to receiving the audio content via the second PAN from the second playback device and play, via the one or more speaker drivers, the audio content received via the second PAN from the second playback device.

In a second example of the wearable device that includes all of the features of the first example wearable device, the program instructions that, when executed by the one or more processors, configure the wearable device to determine whether the wearable device should switch to receiving the audio content via the second PAN from the second playback device comprise program instructions that, when executed by the one or more processors, configure the wearable device to (i) determine a first Received Signal Strength Indicator (RSSI) for broadcasts received from the first playback device, (ii) determine a second RSSI for broadcasts received from the second playback device, and (iii) determine that the wearable device should switch to receiving the audio content via the second PAN from the second playback device when the second RSSI is greater than the first RSSI by a configured margin.

A third example of the wearable device that includes any of the features of the preceding examples of wearable devices comprises one or more microphones, and the program instructions that, when executed by the one or more processors, configure the wearable device to determine whether the wearable device should switch to receiving the audio content via the second PAN from the second playback device comprise program instructions that, when executed by the one or more processors, configure the wearable device to (i) determine a first time difference between when the first playback device emitted a first ultrasonic tone and when the wearable device detected the first ultrasonic tone via the one or more microphones, (ii) determine a second time difference between when the second playback device emitted a second ultrasonic tone and when the wearable device detected the second ultrasonic tone via the one or more microphones, and (iii) determine that the wearable device should switch to receiving the audio content via the second PAN from the second playback device when the second time difference is smaller than the first time difference by a configured margin, thereby indicating that the wearable device is physically closer to the second playback device than the first playback device.

In a fourth example of the wearable device that includes any of the features of the preceding examples of wearable devices, the program instructions that, when executed by the one or more processors, configure the wearable device to switch to receiving the audio content via the second PAN from the second playback device comprise program instructions that, when executed by the one or more processors, configure the wearable device to play a stream change indication via the one or more speaker drivers, where the stream change indication indicates that the wearable device is switching from receiving the audio content from the first playback device via the first PAN to receiving the audio content from the second playback device via the second PAN.

In a fifth example of the wearable device that includes any of the features of the preceding examples of wearable devices, where (i) individual portions of the audio content have corresponding sequence identifiers, (ii) the program instructions that, when executed by the one or more processors, configure the wearable device to play audio content received via the first PAN from the first playback device comprise program instructions that, when executed by the one or more processors, configure the wearable device to arrange the individual portions of the audio content received via the first PAN from the first playback device according to the corresponding sequence identifiers, and (iii) the program instructions that, when executed by the one or more processors, configure the wearable device to play audio content received via the second PAN from the second playback device comprise program instructions that, when executed by the one or more processors, configure the wearable device to arrange the individual portions of the audio content received via the second PAN from the second playback device according to the corresponding sequence identifiers.

In a sixth example of the wearable device that includes all of the features of the fifth example wearable device, the program instructions that, when executed by the one or more processors, configure the wearable device to arrange the individual portions of the audio content received via the second PAN from the second playback device according to the corresponding sequence identifiers comprise program instructions, that when executed by the one or more processors, configure the wearable device to discard any duplicate individual portion of the audio content when the wearable device has received two individual portions of the audio content having the same sequence identifier.

In a seventh example of the wearable device that includes any of the features of the preceding examples of wearable devices, the program instructions that, when executed by the one or more processors, configure the wearable device to determine whether the wearable device should switch to receiving the audio content via the second PAN from the second playback device comprise program instructions that, when executed by the one or more processors, configure the wearable device to determine whether the wearable device should switch to receiving the audio content via the second PAN from the second playback device on one of a periodic or semi-periodic basis.

In an eighth example of the wearable device that includes any of the features of the preceding examples of wearable devices, the PAN communications protocol comprises a Bluetooth protocol.

In a ninth example of the wearable device that includes any of the features of the preceding examples of wearable devices, the wearable device comprises one of (i) a headphone device or (ii) a hearing aid.

A first example of a system comprises a first playback device. The first playback device comprises (i) one or more first processors; (ii) one or more first speaker drivers; (iii) one or more first communication interfaces configured to communicate via a Personal Area Network (PAN) and a Wireless Local Area Network (WLAN); (iv) a first tangible, non-transitory computer-readable memory; and (v) first program instructions stored on the first tangible, non-transitory computer-readable memory, where the first program instructions, when executed by the one or more first processors, configure the first playback device to (i) transmit clock timing information to a second playback device, where the clock timing information is associated with a first clock at the first playback device; (ii) obtain audio content from an audio content source via the WLAN according to a first communications protocol; (iii) generate playback times for individual portions of the audio content, where the playback time for an individual portion of the audio content is indicative of a future time relative the first clock at the first playback device; (iv) transmit a series of frames to the second playback device via the WLAN according to the first communications protocol, where the series of frames comprises the individual portions of the audio content, and the playback times for the individual portions of the audio content; and (v) based on a current clock time of the first clock at the first playback device and the playback time for an individual portion of the audio content, broadcast, via a second communications protocol that is different than the first communications protocol, that portion of the audio content to a first PAN in synchrony with the second playback device broadcasting that portion of the audio content to a second PAN.

A second example of the system that includes all of the features of the first example system comprises the second playback device. The second playback device comprises (i) one or more second processors; (ii) one or more second speaker drivers; (iii) one or more first second interfaces configured to communicate via the Personal Area Network (PAN) and the Wireless Local Area Network (WLAN); (iv) a second tangible, non-transitory computer-readable memory; and (v) second program instructions stored on the second tangible, non-transitory computer-readable memory, where the second program instructions, when executed by the one or more second processors, configure the second playback device to (i) receive the clock timing information and the series of frames from the first playback device via the WLAN, where the series of frames comprises the individual portions of the audio content, and the playback times for the individual portions of the audio content; (ii) generate updated playback times for the individual portions of the audio content based on a difference between the first clock at the first playback device and a second clock at the second playback device, where the difference is based on the clock timing information; and (iii) based on a current clock time of the second clock at the second playback device and the updated playback time for an individual portion of the audio content, broadcast, via the second communications protocol that is different than the first communications protocol, that portion of the audio content to the second PAN in synchrony with the first playback device broadcasting that portion of the audio content to the first PAN.

A third example of the system that includes any of the features of the preceding examples of systems comprises a wearable device. The wearable device comprises (i) one or more third processors; (ii) one or more third speaker drivers; (iii) a third communication interface configured to communicate via the Personal Area Network (PAN) communications protocol; (iv) a third tangible, non-transitory computer-readable memory; and (v) third program instructions stored on the third tangible, non-transitory computer-readable memory, where the third program instructions, when executed by the one or more third processors, configure the wearable device to (i) via the one or more third speaker drivers, play audio content received via the first PAN from the first playback device; (ii) while playing the audio content received via the first PAN from the first playback device, determine whether the wearable device should switch to receiving the audio content via the second PAN from the second playback device; and (iii) after determining that the wearable device should switch to receiving the audio content via the second PAN from the second playback device, switch to receiving the audio content via the second PAN from the second playback device and play, via the one or more third speaker drivers, the audio content received via the second PAN from the second playback device.

IX. Conclusions

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first playback device, wherein the first playback device comprises:
   one or more processors;
   one or more speaker drivers;
   one or more communication interfaces configured to communicate via a Personal Area Network (PAN) and a Wireless Local Area Network (WLAN);
   a tangible, non-transitory computer-readable memory; and
   program instructions stored on the tangible, non-transitory computer-readable memory, wherein the program instructions, when executed by the one or more processors, configure the first playback device to:
   obtain audio content from an audio content source via the WLAN according to a first communications protocol;
   generate playback times for individual portions of the audio content, wherein the playback time for an individual portion of the audio content is indicative of a future time relative to a clock at the first playback device;
   generate broadcast times for the individual portions of the audio content based on the playback times for the individual portions of the audio content, wherein the broadcast time for an individual portion of the audio content is based on the playback time for that individual portion of the audio content; and
   based on a current clock time of the clock at the first playback device and the broadcast time for an individual portion of the audio content, broadcast that individual portion of the audio content to a PAN according to a second communications protocol that is different than the first communications protocol.

2. The first playback device of claim 1, wherein the program instructions further comprise program instructions that, when executed by the one or more processors, configure the first playback device to:
   based on the current clock time of the clock at the first playback device and the playback time for an individual portion of the audio content, play that individual portion of the audio content via the one or more speaker drivers.

3. The first playback device of claim 1, wherein the broadcast time for an individual portion of the audio content is earlier than the playback time for that individual portion of the audio content.

4. The first playback device of claim 1, wherein the program instructions comprise program instructions that, when executed by the one or more processors, configure the first playback device to:
   transmit the individual portions of the audio content and the playback times for the individual portions of the audio content to at least a second playback device via the WLAN according to the first communications protocol.

5. The first playback device of claim 1, wherein the program instructions comprise program instructions that, when executed by the one or more processors, configure the first playback device to:
   transmit the individual portions of the audio content and the broadcast times for the individual portions of the audio content to at least a second playback device via the WLAN according to the first communications protocol.

6. The first playback device of claim 1, wherein the first playback device further comprises a wired communication interface, and wherein the program instructions comprise program instructions that, when executed by the one or more processors, configure the first playback device to:

generate data output times for the individual portions of the audio content based on the playback times for the individual portions of the audio content, wherein the data output time for an individual portion of the audio content is based on the playback time for that individual portion of the audio content; and based on the current clock time of the clock at the first playback device and the data output time for an individual portion of the audio content, transmit that individual portion of the audio content via the wired communication interface according to a third communications protocol that is different than the first and second communications protocols.

7. The first playback device of claim 1, wherein the program instructions that, when executed by the one or more processors, configure the first playback device to generate broadcast times for the individual portions of the audio content based on the playback times for the individual portions of the audio content comprise program instructions that, when executed by the one or more processors, configure the first playback device to generate broadcast times for the individual portions of the audio content based on the playback times for the individual portions of the audio content after detecting that a wearable device is within broadcast range of the PAN.

8. The first playback device of claim 7, wherein the broadcast time for an individual portion of the audio content is based on a distance between the first playback device and the wearable device that is within broadcast range of the PAN, and the program instructions, when executed by the one or more processors, configure the first playback device to:

emit an ultrasonic tone via the one or more speaker drivers; and after receiving an indication of when the wearable device detected the ultrasonic tone, determine the distance between the first playback device and the wearable device based on when the wearable device detected the ultrasonic tone.

9. The first playback device of claim 7, wherein the broadcast time for an individual portion of the audio content is based on a distance between the first playback device and the wearable device that is within broadcast range of the PAN, and the program instructions, when executed by the one or more processors, configure the first playback device to:

determine the distance between the first playback device and the wearable device based on Received Signal Strength Indicator (RSSI) data received from the wearable device.

10. A wearable device comprising:

one or more processors;

one or more speaker drivers;

a communication interface configured to communicate via a Personal Area Network (PAN) communications protocol;

a tangible, non-transitory computer-readable memory;

a housing configured to be worn by a user, wherein the housing carries the one or more processors, the one or more speaker drivers, the communication interface, and the tangible, non-transitory computer-readable memory; and program instructions stored on the tangible, non-transitory computer-readable memory, wherein the program instructions, when executed by the one or more processors, configure the wearable device to:

via the one or more speaker drivers, play audio content received via a first PAN from a first playback device;

while playing the audio content received via the first PAN from the first playback device, determine whether the wearable device should switch to receiving the audio content via a second PAN from a second playback device on one of a periodic or semi-periodic basis; and after determining that the wearable device should switch to receiving the audio content via the second PAN from the second playback device, switch to receiving the audio content via the second PAN from the second playback device and play, via the one or more speaker drivers, the audio content received via the second PAN from the second playback device.

11. The wearable device of claim 10, wherein the program instructions that, when executed by the one or more processors, configure the wearable device to determine whether the wearable device should switch to receiving the audio content via the second PAN from the second playback device comprise program instructions that, when executed by the one or more processors, configure the wearable device to (i) determine a first Received Signal Strength Indicator (RSSI) for broadcasts received from the first playback device, (ii) determine a second RSSI for broadcasts received from the second playback device, and (iii) determine that the wearable device should switch to receiving the audio content via the second PAN from the second playback device when the second RSSI is greater than the first RSSI by a configured margin.

12. The wearable device of claim 10, further comprising one or more microphones, and wherein the program instructions that, when executed by the one or more processors, configure the wearable device to determine whether the wearable device should switch to receiving the audio content via the second PAN from the second playback device comprise program instructions that, when executed by the one or more processors, configure the wearable device to (i) determine a first time difference between when the first playback device emitted a first ultrasonic tone and when the wearable device detected the first ultrasonic tone via the one or more microphones, (ii) determine a second time difference between when the second playback device emitted a second ultrasonic tone and when the wearable device detected the second ultrasonic tone via the one or more microphones, and (iii) determine that the wearable device should switch to receiving the audio content via the second PAN from the second playback device when the second time difference is smaller than the first time difference by a configured margin, thereby indicating that the wearable device is physically closer to the second playback device than the first playback device.

13. The wearable device of claim 10, wherein the program instructions that, when executed by the one or more processors, configure the wearable device to switch to receiving the audio content via the second PAN from the second playback device comprise program instructions that, when executed by the one or more processors, configure the wearable device to play a stream change indication via the one or more speaker drivers, wherein the stream change indication indicates that the wearable device is switching from receiving the audio content from the first playback device via the first PAN to receiving the audio content from the second playback device via the second PAN.

14. The wearable device of claim 10, wherein (i) individual portions of the audio content have corresponding sequence identifiers, (ii) wherein the program instructions that, when executed by the one or more processors, configure the wearable device to play audio content received via the first PAN from the first playback device comprise program instructions that, when executed by the one or more processors, configure the wearable device to arrange the individual portions of the audio content received via the first PAN from the first playback device according to the corresponding sequence identifiers, and (iii) wherein the program instructions that, when executed by the one or more processors, configure the wearable device to play audio content received via the second PAN from the second playback device comprise program instructions that, when executed by the one or more processors, configure the wearable device to arrange the individual portions of the audio content received via the second PAN from the second playback device according to the corresponding sequence identifiers.

15. The wearable device of claim 14, wherein the program instructions that, when executed by the one or more processors, configure the wearable device to arrange the individual portions of the audio content received via the second PAN from the second playback device according to the corresponding sequence identifiers comprises program instructions, that when executed by the one or more processors, configure the wearable device to discard any duplicate individual portion of the audio content when the wearable device has received two individual portions of the audio content having the same sequence identifier.

16. The wearable device of claim 10, wherein the wearable device comprises one of (i) a headphone device or (ii) a hearing aid.

17. A system comprising a first playback device, wherein the first playback device comprises:

one or more first processors;

one or more first speaker drivers;

one or more first communication interfaces configured to communicate via a Personal Area Network (PAN) and a Wireless Local Area Network (WLAN);

a first tangible, non-transitory computer-readable memory; and first program instructions stored on the first tangible, non-transitory computer-readable memory, wherein the first program instructions, when executed by the one or more first processors, configure the first playback device to:

transmit clock timing information to a second playback device, wherein the clock timing information is associated with a first clock at the first playback device;

obtain audio content from an audio content source via the WLAN according to a first communications protocol;

generate playback times for individual portions of the audio content, wherein the playback time for an individual portion of the audio content is indicative of a future time relative to the first clock at the first playback device;

transmit a series of frames to the second playback device via the WLAN according to the first communications protocol, wherein the series of frames comprises the individual portions of the audio content, and the playback times for the individual portions of the audio content; and based on a current clock time of the first clock at the first playback device and the playback time for an individual portion of the audio content, broadcast, via a second communications protocol that is different than the first communications protocol, that individual portion of the audio content to a first PAN in synchrony with the second playback device broadcasting that portion of the audio content to a second PAN.

18. The system of claim 17, further comprising the second playback device, wherein the second playback device comprises:

one or more second processors;

one or more second speaker drivers;

one or more first second interfaces configured to communicate via the Personal Area Network (PAN) and the Wireless Local Area Network (WLAN);

a second tangible, non-transitory computer-readable memory; and second program instructions stored on the second tangible, non-transitory computer-readable memory, wherein the second program instructions, when executed by the one or more second processors, configure the second playback device to:

receive the clock timing information and the series of frames from the first playback device via the WLAN, wherein the series of frames comprises the individual portions of the audio content, and the playback times for the individual portions of the audio content;

generate updated playback times for the individual portions of the audio content based on a difference between the first clock at the first playback device and a second clock at the second playback device, wherein the difference is based on the clock timing information; and based on a current clock time of the second clock at the second playback device and the updated playback time for an individual portion of the audio content, broadcast, via the second communications protocol that is different than the first communications protocol, that individual portion of the audio content to the second PAN in synchrony with the first playback device broadcasting that individual portion of the audio content to the first PAN.

19. The system of claim 17, further comprising a wearable device, wherein the wearable device comprises:

one or more third processors;

one or more third speaker drivers;

a third communication interface configured to communicate via the Personal Area Network (PAN) communications protocol;

a third tangible, non-transitory computer-readable memory; and third program instructions stored on the third tangible, non-transitory computer-readable memory, wherein the third program instructions, when executed by the one or more third processors, configure the wearable device to:

via the one or more third speaker drivers, play audio content received via the first PAN from the first playback device;

while playing the audio content received via the first PAN from the first playback device, determine whether the wearable device should switch to receiving the audio content via the second PAN from the second playback device; and after determining that the wearable device should switch to receiving the audio content via the second PAN from the second playback device, switch to receiving the audio content via the second PAN from the second playback device and play, via the one or more third speaker drivers, the audio content received via the second PAN from the second playback device.

* * * * *